US007014336B1

(12) United States Patent
Ducharme et al.

(10) Patent No.: US 7,014,336 B1
(45) Date of Patent: Mar. 21, 2006

(54) SYSTEMS AND METHODS FOR GENERATING AND MODULATING ILLUMINATION CONDITIONS

(75) Inventors: Alfred D. Ducharme, Tewksbury, MA (US); Frederick M. Morgan, Quincy, MA (US); Ihor A. Lys, Boston, MA (US); Kevin J. Dowling, Westford, MA (US); George G. Mueller, Boston, MA (US)

(73) Assignee: Color Kinetics Incorporated, Boston, MA (US)

( * ) Notice: Subject to any disclaimer, the term of this patent is extended or adjusted under 35 U.S.C. 154(b) by 0 days.

(21) Appl. No.: 09/716,819

(22) Filed: Nov. 20, 2000

Related U.S. Application Data

(60) Provisional application No. 60/166,533, filed on Nov. 18, 1999, provisional application No. 60/201,140, filed on May 2, 2000, provisional application No. 60/235,678, filed on Sep. 27, 2000.

(51) Int. Cl.
  *F21V 9/10* (2006.01)
(52) U.S. Cl. .................. 362/231; 362/240; 362/800
(58) Field of Classification Search ............ 362/229, 362/230, 231, 236, 240, 251, 255, 293, 295, 362/800
  See application file for complete search history.

(56) References Cited

U.S. PATENT DOCUMENTS

| | | | |
|---|---|---|---|
| 2,725,461 A | 11/1955 | Amour | |
| 3,595,991 A | 7/1971 | Diller | |
| 3,760,174 A | 9/1973 | Boenning et al. | |
| 4,271,408 A | 6/1981 | Teshima et al. | |
| 4,339,788 A | 7/1982 | White et al. | |
| 4,342,947 A | 8/1982 | Bloyd | |
| 4,455,562 A | 6/1984 | Dolan et al. | |
| 4,656,398 A | 4/1987 | Michael et al. | |
| 4,845,481 A | 7/1989 | Havel | |
| 4,857,801 A | 8/1989 | Farrell | |
| 4,870,325 A | 9/1989 | Kazar | |
| 4,947,291 A | 8/1990 | McDermott | |
| 4,962,687 A | 10/1990 | Belliveau et al. | |
| 5,008,788 A | 4/1991 | Palinkas | |
| 5,036,248 A | 7/1991 | McEwan et al. | |
| 5,038,255 A | 8/1991 | Nishihashi et al. | |
| 5,089,748 A | 2/1992 | Ihms | |
| 5,136,483 A | 8/1992 | Schöniger et al. | |
| 5,161,879 A | 11/1992 | McDermott | |
| 5,278,542 A | 1/1994 | Smith et al. | |
| 5,287,352 A | 2/1994 | Jackson et al. | |

(Continued)

FOREIGN PATENT DOCUMENTS

CA    2134848    11/1998

(Continued)

OTHER PUBLICATIONS

Goldstein Michael; "The Smart House", Acura Style, www.acura.com.

(Continued)

*Primary Examiner*—Y. My Quach-Lee
(74) *Attorney, Agent, or Firm*—Foley Hoag LLP

(57) ABSTRACT

The present invention relates to systems and methods for generating and/or modulating illumination conditions to generate high-quality light of a desired and controllable color, for creating lighting fixtures for producing light in desirable and reproducible colors, and for modifying the color temperature or color shade of light within a prespecified range after a lighting fixture is constructed. In one embodiment, LED lighting units capable of generating light of a range of colors are used to provide light or supplement ambient light to afford lighting conditions suitable for a wide range of applications.

243 Claims, 23 Drawing Sheets

U.S. PATENT DOCUMENTS

| | | | |
|---|---|---|---|
| 5,301,090 A | 4/1994 | Hed | |
| 5,350,977 A | 9/1994 | Hamamoto et al. | |
| 5,375,043 A | 12/1994 | Tokunaga | |
| 5,388,357 A * | 2/1995 | Malita | 362/812 |
| 5,420,482 A | 5/1995 | Phares | |
| 5,450,301 A | 9/1995 | Waltz et al. | |
| 5,519,496 A | 5/1996 | Bogert et al. | |
| 5,521,708 A | 5/1996 | Beretta | |
| 5,532,848 A | 7/1996 | Beretta | |
| 5,535,230 A | 7/1996 | Abe | |
| 5,559,681 A | 9/1996 | Duarte | |
| 5,621,282 A | 4/1997 | Haskell | |
| 5,621,603 A | 4/1997 | Adamec et al. | |
| 5,634,711 A | 6/1997 | Kennedy et al. | |
| 5,684,309 A | 11/1997 | McIntosh et al. | |
| 5,688,042 A * | 11/1997 | Madadi et al. | 362/800 |
| 5,712,650 A | 1/1998 | Barlow | |
| 5,721,471 A | 2/1998 | Begemann et al. | 315/158 |
| 5,752,766 A | 5/1998 | Bailey et al. | |
| 5,790,329 A | 8/1998 | Klaus et al. | |
| 5,803,579 A | 9/1998 | Turnbull et al. | 362/83.1 |
| 5,812,105 A | 9/1998 | Van de Ven | |
| 5,813,753 A | 9/1998 | Vriens | |
| 5,831,686 A | 11/1998 | Beretta | |
| 5,836,676 A | 11/1998 | Ando et al. | |
| 5,838,247 A | 11/1998 | Bladowski | |
| 5,850,126 A | 12/1998 | Kanbar | |
| 5,851,063 A | 12/1998 | Doughty et al. | 362/231 |
| 5,854,542 A | 12/1998 | Forbes | |
| 5,895,986 A | 4/1999 | Walters et al. | |
| 5,907,742 A | 5/1999 | Johnson et al. | |
| 5,924,784 A | 7/1999 | Chliwnyj et al. | |
| 5,961,201 A | 10/1999 | Gismondi | |
| 6,016,038 A | 1/2000 | Mueller et al. | |
| 6,020,825 A | 2/2000 | Chansky et al. | |
| 6,028,694 A | 2/2000 | Schmidt | |
| 6,056,420 A | 5/2000 | Wilson et al. | |
| 6,068,383 A | 5/2000 | Robertson et al. | |
| 6,127,783 A | 10/2000 | Pashley et al. | |
| 6,132,072 A | 10/2000 | Turnbull et al. | 362/494 |
| 6,149,283 A | 11/2000 | Conway et al. | |
| 6,150,771 A | 11/2000 | Perry | |
| 6,150,774 A | 11/2000 | Mueller et al. | |
| 6,158,882 A | 12/2000 | Bischoff, Jr. | |
| 6,166,496 A | 12/2000 | Lys et al. | |
| 6,183,086 B1 | 2/2001 | Neubert | |
| 6,183,104 B1 | 2/2001 | Ferrara | |
| 6,183,108 B1 | 2/2001 | Herold | |
| 6,188,181 B1 | 2/2001 | Sinha et al. | |
| 6,211,626 B1 | 4/2001 | Lys et al. | |
| 6,212,213 B1 | 4/2001 | Weber et al. | |
| 6,234,645 B1 | 5/2001 | Borner et al. | |
| 6,234,648 B1 | 5/2001 | Börner et al. | |
| 6,235,648 B1 | 5/2001 | Mizuhara et al. | |
| 6,250,774 B1 | 6/2001 | Begemann et al. | |
| 6,252,254 B1 | 6/2001 | Soules et al. | |
| 6,255,670 B1 | 7/2001 | Srivastava et al. | |
| 6,273,589 B1 | 8/2001 | Weber et al. | |
| 6,283,612 B1 | 9/2001 | Hunter | |
| 6,292,901 B1 | 9/2001 | Lys et al. | |
| 6,294,800 B1 | 9/2001 | Duggal et al. | |
| 6,299,329 B1 | 10/2001 | Mui | |
| 6,323,832 B1 | 11/2001 | Nishizawa et al. | |
| 6,329,764 B1 | 12/2001 | van de Ven | |
| 6,330,111 B1 | 12/2001 | Myers | |
| 6,331,915 B1 | 12/2001 | Myers | |
| 6,340,868 B1 | 1/2002 | Lys et al. | |
| 6,357,889 B1 | 3/2002 | Duggal et al. | |
| 6,357,893 B1 | 3/2002 | Belliveau | |
| 6,361,186 B1 | 3/2002 | Slayden | |
| 6,369,525 B1 | 4/2002 | Chang et al. | |
| 6,379,022 B1 | 4/2002 | Amerson et al. | |
| 6,411,046 B1 | 6/2002 | Muthu | |
| 6,441,558 B1 | 8/2002 | Muthu et al. | |
| 6,445,139 B1 | 9/2002 | Marshall et al. | |
| 6,448,550 B1 | 9/2002 | Nishimura | |
| 6,459,919 B1 | 10/2002 | Lys et al. | |
| 6,469,322 B1 | 10/2002 | Srivastava et al. | |
| 6,474,837 B1 | 11/2002 | Belliveau | |
| 6,495,964 B1 | 12/2002 | Muthu et al. | |
| 6,504,301 B1 | 1/2003 | Lowery | |
| 6,507,159 B1 | 1/2003 | Muthu | |
| 6,510,995 B1 | 1/2003 | Muthu et al. | |
| 6,513,949 B1 | 2/2003 | Marshall et al. | |
| 6,528,954 B1 | 3/2003 | Lys et al. | |
| 6,548,967 B1 | 4/2003 | Dowling et al. | |
| 6,550,952 B1 | 4/2003 | Hulse et al. | |
| 6,551,282 B1 | 4/2003 | Exline et al. | |
| 6,552,495 B1 | 4/2003 | Chang | |
| 6,577,080 B1 | 6/2003 | Lys et al. | |
| 6,592,238 B1 | 7/2003 | Cleaver et al. | |
| 6,596,977 B1 | 7/2003 | Muthu et al. | |
| 6,599,000 B1 | 7/2003 | Nolan et al. | |
| 6,600,175 B1 | 7/2003 | Baretz et al. | |
| 6,608,453 B1 | 8/2003 | Morgan et al. | |
| 6,624,597 B1 | 9/2003 | Dowling et al. | |
| 6,630,691 B1 | 10/2003 | Mueller-Mach et al. | |
| 6,630,801 B1 | 10/2003 | Schuurmans | |
| 6,636,003 B1 | 10/2003 | Rahm et al. | |
| 6,692,136 B1 | 2/2004 | Marshall et al. | |
| 6,717,376 B1 | 4/2004 | Lys et al. | |
| 6,720,745 B1 | 4/2004 | Mueller et al. | |
| 6,726,350 B1 | 4/2004 | Herold | |
| 2001/0033488 A1 | 10/2001 | Chliwnyj et al. | |
| 2002/0038157 A1 | 3/2002 | Dowling et al. | |
| 2002/0044066 A1 | 4/2002 | Dowling et al. | |
| 2002/0047569 A1 | 4/2002 | Dowling et al. | |
| 2002/0047624 A1 | 4/2002 | Stam et al. | |
| 2002/0048169 A1 | 4/2002 | Dowling et al. | |
| 2002/0057061 A1 | 5/2002 | Mueller et al. | |
| 2002/0060526 A1 | 5/2002 | Timmermans et al. | |
| 2002/0070688 A1 | 6/2002 | Dowling et al. | |
| 2002/0074559 A1 | 6/2002 | Dowling et al. | |
| 2002/0078221 A1 | 6/2002 | Blackwell et al. | |
| 2002/0101197 A1 | 8/2002 | Lys et al. | |
| 2002/0130627 A1 | 9/2002 | Dowling et al. | |
| 2002/0145394 A1 | 10/2002 | Morgan et al. | |
| 2002/0145869 A1 | 10/2002 | Dowling | |
| 2002/0152045 A1 | 10/2002 | Dowling et al. | |
| 2002/0153851 A1 | 10/2002 | Dowling et al. | |
| 2002/0158583 A1 | 10/2002 | Lys et al. | |
| 2002/0163316 A1 | 11/2002 | Dowling et al. | |
| 2002/0171365 A1 | 11/2002 | Morgan et al. | |
| 2002/0171377 A1 | 11/2002 | Mueller et al. | |
| 2002/0171378 A1 | 11/2002 | Morgan et al. | |
| 2002/0176259 A1 | 11/2002 | Ducharme | |
| 2002/0195975 A1 | 12/2002 | Dowling et al. | |
| 2003/0011538 A1 | 1/2003 | Lys et al. | |
| 2003/0028260 A1 | 2/2003 | Blackwell | |
| 2003/0057884 A1 | 3/2003 | Dowling et al. | |
| 2003/0057886 A1 | 3/2003 | Lys et al. | |
| 2003/0057887 A1 | 3/2003 | Dowling et al. | |
| 2003/0057890 A1 | 3/2003 | Lys et al. | |
| 2003/0076281 A1 | 4/2003 | Morgan et al. | |
| 2003/0100837 A1 | 5/2003 | Lys et al. | |
| 2003/0107887 A1 | 6/2003 | Eberl | |
| 2003/0133292 A1 | 7/2003 | Mueller et al. | |
| 2003/0137258 A1 | 7/2003 | Piepgras et al. | |
| 2003/0189412 A1 | 10/2003 | Cunningham | |
| 2003/0198061 A1 | 10/2003 | Chambers et al. | |
| 2003/0222587 A1 | 12/2003 | Dowling et al. | |
| 2004/0032226 A1 | 2/2004 | Lys | |
| 2004/0036006 A1 | 2/2004 | Dowling | |
| 2004/0052076 A1 | 3/2004 | Mueller et al. | |

| | | |
|---|---|---|
| 2004/0066652 A1 | 4/2004 | Hong |
| 2004/0090787 A1 | 5/2004 | Dowling et al. |
| 2004/0105261 A1 | 6/2004 | Ducharme et al. |
| 2004/0130909 A1 | 7/2004 | Mueller et al. |
| 2004/0218387 A1 | 11/2004 | Gerlach |

FOREIGN PATENT DOCUMENTS

| | | |
|---|---|---|
| DE | 2315709 | 10/1974 |
| DE | 3438154 A1 | 4/1986 |
| DE | 03837313 | 5/1989 |
| DE | 03805998 | 9/1989 |
| DE | 3925767 A1 | 4/1990 |
| DE | 3917101 | 11/1990 |
| DE | 3916875 | 12/1990 |
| DE | 4041338 A1 | 7/1992 |
| DE | 4130576 C1 | 3/1993 |
| DE | 9414689 | 2/1995 |
| DE | 4419006 A1 | 12/1995 |
| DE | 29607270 U1 | 8/1996 |
| DE | 19525897 | 10/1996 |
| DE | 29620583 U1 | 3/1997 |
| DE | 19651140 A1 | 6/1997 |
| DE | 19602891 A1 | 7/1997 |
| DE | 19602891 A1 | 8/1997 |
| EP | 482680 A1 | 4/1992 |
| EP | 567280 B1 | 10/1993 |
| EP | 734082 A2 | 9/1996 |
| EP | 0 838 866 A2 | 4/1998 |
| EP | 1 160 883 A2 | 5/2001 |
| EP | 1162400 A2 | 12/2001 |
| GB | 2131589 A | 11/1982 |
| GB | 2210720 A | 6/1989 |
| JP | 08-007611 | 12/1996 |
| JP | 10-071951 | 3/1998 |
| JP | 02000057488 A | 2/2000 |
| KR | 1019910009812 | 11/1991 |
| WO | 97/48138 | 12/1997 |
| WO | WO 99/06759 | 2/1999 |
| WO | WO 99/30537 | 6/1999 |
| WO | WO 00/19141 | 4/2000 |
| WO | WO 01/24229 A2 | 4/2001 |
| WO | WO 01/73818 A1 | 10/2001 |
| WO | 0201921 A1 | 1/2002 |
| WO | WO 02/061328 A1 | 8/2002 |
| WO | 03053108 A1 | 6/2003 |

OTHER PUBLICATIONS

Morrison David, "Brighter LEDs Signal Longer Life And Lower Power For Lighting Applications", www.planetee.com.

Robert K. John, "Binary Complementary Synthetic-White LED Illuminators", SAE Technical Paper Series, presented at the International Congress and Exposition, Detroit, Michigan, Mar. 1-4, 1999.

ARI International; "LED White Caps", www.ari-corp.com.

Hewlett Packard Components, "Solid State Display and Optoelectronics Designer's Catalog," pp. 30-43, Jul. 1973.

INTEC Research, TRACKSPOT, http://www.intec-research.com/trackspot.htm, pp. 1-4, Apr. 24, 2003.

SHARP, Optoelectronics Data Book, pp. 1096-1097, 1994/1995.

About DMX-512 Lighting Protocol—Pangolin Laser Systems, pp. 1-4, Apr. 7, 2003.

Furry, Kevin and Somerville, Chuck, Affidavit, LED effects, Feb. 22, 2002, pp. 24-29.

Putman, Peter H., "The Allure of LED," www.sromagazine.biz, Jun./Jul. 2002, pp. 47-52.

Bremer, Darlene, "LED Advancements Increase Potential," www.ecmag.com, Apr. 2002, p. 115.

Longo, Linda, "LEDS Lead the Way," Home Lighting & Accessories, Jun. 2002, pp. 226-234.

Case No. 6:02-cv-270-ORL-19JGG in the United States District Court, Middle District of Florida, Orlando Division, Plaintiff's Amended Verified Complaint.

Case No. 6:02-cv-270-ORL-19JGG in the United States District Court, Middle District of Florida, Orlando Division, Defendant's Answer and Counterclaims.

Case No. 02 CV 11137MEL in the United States District Court, District of Massachusetts, Plaintiff's Complaint and Jury Demand.

Case No. 02 CV 11137MEL in the United States District Court, District of Massachusetts, Defendant's Answer and Affirmative Defenses.

Co-Pending U.S. Appl. No. 09/805,368, filed Mar. 13, 2001, entitled "Light-Emitting Diode Based Products," our File No. C01104/70015.

Co-Pending U.S. Appl. No. 09/213,607, filed Dec. 17, 1998, entitled "Systems and Methods for Sensor-Responsive Illumination," our File No. C01104/70054.

Co-Pending U.S. Appl. No. 09/215,624, filed Dec. 17, 1998, entitled "Smart Light Bulb," our File No. C01104/70055.

Co-Pending U.S. Appl. No. 09/333,739, filed Jun. 15, 1999, entitled "Diffuse Illumination Systems and Methods," our File No. C01104/70056.

Co-Pending U.S. Appl. No. 10/159,593, filed May 30, 2002, entitled "Linear Lighting Apparatus and Methods," our File No. C01104/70062.

Co-Pending U.S. Appl. No. 09/675,419, filed Sep. 29, 2000, entitled "Systems and Methods for Calibrating Light Output by Light-Emitting Diodes," our File No. C01104/70073.

Co-Pending U.S. Appl. No. 10/040,292, filed Oct. 25, 2001, entitled "Light Sources for Illumination of Liquids," our File No. C01104/70089.

Co-Pending U.S. Appl. No. 10/245,788, filed Sep. 17, 2002, entitled "Methods and Apparatus for Generating and Modulating White Light Illumination Conditions," our File No. C01104/70109.

Technical Specification, LEDRA I, Bruck Lighting Systems, 3505 Cadillac Ave. L-5, Costa Mesa, CA 92626, www.brucklighting.com, 1 page.

Technical Specification, LEDRA II, Bruck Lighting Systems, 3505 Cadillac Ave. L-5, Costa Mesa, CA 92626, www.brucklighting.com, 1 page.

Technical Specification, LEDRA R, Bruck Lighting Systems, 3505 Cadillac Ave. L-5, Costa Mesa, CA 92626, www.brucklighting.com, 1 page.

Technical Specification, LEDRA Display, Bruck Lighting Systems, 3505 Cadillac Ave. L-5, Costa Mesa, CA 92626, www.brucklighting.com, 1 page.

iLight Technologies, "Explore the iLight Possibilities", http://www.ilight-tech.com, Sep. 7, 2004, 1 page.

iLight Technologies, "Curved or straight in white or color", http://www.ilight-tech.com/products.htm, Sep. 7, 2004, 1 page.

iLight Technologies, "Curved or straight in white or color",/products_white.htm, Sep. 7, 2004, 1 page.

iLight Technologies, "Curved or straight in white or color",/products_color.htm, Sep. 7, 2004, 1 page.

iLight Technologies, "Curved or straight in white or color",/products_signs.htm, Sep. 7, 2004, 1 page.

Materials from http:-www.artisticlicense.com-appnotes-appnote015.pdf, LDI Las Vegas, 2002.

* cited by examiner

SYSTEMS AND METHODS FOR GENERATING AND MODULATING ILLUMINATION CONDITIONS

REFERENCE TO RELATED US APPLICATIONS

The following application claims priority to U.S. Provisional Application Ser. No. 60/166,533 filed Nov. 18, 1999; U.S. Provisional Application Ser. No. 60/201,140 filed May 2, 2000; and U.S. Provisional Application Ser. No. 60/235, 678 filed Sep. 27, 2000. The disclosures of all of the above references are herein incorporated by reference.

BACKGROUND OF THE INVENTION

Human beings have grown accustomed to controlling their environment. Nature is unpredictable and often presents conditions that are far from a human being's ideal living conditions. The human race has therefore tried for years to engineer the environment inside a structure to emulate the outside environment at a perfect set of conditions. This has involved temperature control, air quality control and lighting control.

The desire to control the properties of light in an artificial environment is easy to understand. Humans are primarily visual creatures with much of our communication being done visually. We can identify friends and loved ones based on primarily visual cues and we communicate through many visual mediums, such as this printed page. At the same time, the human eye requires light to see by and our eyes (unlike those of some other creatures) are particularly sensitive to color.

With today's ever increasing work hours and time constraints, less and less of the day is being spent by the average human outside in natural sunlight. In addition, humans spend about a third of their lives asleep, and as the economy increases to 24/7/365, many employees no longer have the luxury of spending their waking hours during daylight. Therefore, most of an average human's life is spent inside, illuminated by manmade sources of light.

Visible light is a collection of electromagnetic waves (electromagnetic radiation) of different frequencies, each wavelength of which represents a particular "color" of the light spectrum. Visible light is generally thought to comprise those light waves with wavelength between about 400 and about 700 $\mu$m. Each of the wavelengths within this spectrum comprises a distinct color of light from deep blue/purple at around 400 nm to dark red at around 700 $\mu$m. Mixing these colors of light produces additional colors of light. The distinctive color of a neon sign results from a number of discrete wavelengths of light. These wavelengths combine additively to produce the resulting wave or spectrum which makes up a color. One such color is white light.

Because of the importance of white light, and since white light is the mixing of multiple wavelengths of light, there have arisen multiple techniques for characterization of white light that relate to how human beings interpret a particular white light. The first of these is the use of color temperature which relates to the color of the light within white. Correlated color temperature is characterized in color reproduction fields according to the temperature in degrees Kelvin (K) of a black body radiator which radiates the same color light as the light in question. FIG. 1 is a chromaticity diagram in which Planckian locus (or black body locus or white line) (104) gives the temperatures of whites from about 700 K (generally considered the first visible to the human eye) to essentially the terminal point. The color temperature of viewing light depends on the color content of the viewing light as shown by line (104). Thus, early morning daylight has a color temperature of about 3,000 K while overcast midday skies have a white color temperature of about 10,000 K. A fire has a color temperature of about 1,800 K and an incandescent bulb about 2848 K. A color image viewed at 3,000 K will have a relatively reddish tone, whereas the same color image viewed at 10,000 K will have a relatively bluish tone. All of this light is called "white," but it has varying spectral content.

The second classification of white light involves its quality. In 1965 the Commission Internationale de l'Eclairage (CIE) recommended a method for measuring the color rendering properties of light sources based on a test color sample method. This method has been updated and is described in the CIE 13.3-1995 technical report "Method of Measuring and Specifying Colour Rendering Properties of Light Sources," the disclosure of which is herein incorporated by reference. In essence, this method involves the spectroradiometric measurement of the light source under test. This data is multiplied by the reflectance spectrums of eight color samples. The resulting spectrums are converted to tristimulus values based on the CIE 1931 standard observer. The shift of these values with respect to a reference light are determined for the uniform color space (UCS) recommended in 1960 by the CIE. The average of the eight color shifts is calculated to generate the General Color Rendering Index, known as CRI. Within these calculations the CRI is scaled so that a perfect score equals 100, where perfect would be using a source spectrally equal to the reference source (often sunlight or full spectrum white light). For example a tungsten-halogen source compared to full spectrum white light might have a CRI of 99 while a warm white fluorescent lamp would have a CRI of 50.

Artificial lighting generally uses the standard CRI to determine the quality of white light. If a light yields a high CRI compared to full spectrum white light then it is considered to generate better-quality white light (light that is more "natural" and enables colored surfaces to be better rendered). This method has been used since 1965 as a point of comparison for all different types of light sources.

The correlated color temperature, and CRI, of viewing light can affect the way in which an observer perceives a color image. An observer will perceive the same color image differently when viewed under lights having different correlated color temperatures. For example, a color image which looks normal when viewed in early morning daylight will look bluish and washed out when viewed under overcast midday skies. Further, a white light with a poor CRI may cause colored services to appear distorted.

The color temperature and/or CRI of light is critical to creators of images, such as photographers, film and television producers, painters, etc., as well as to the viewers of paintings, photographs, and other such images. Ideally, both creator and viewer utilize the same color of ambient light, ensuring that the appearance of the image to the viewer matches that of the creator.

Additionally, color temperature of ambient light affects how viewers perceive a display, such as a retail or marketing display, by changing the perceived color of such items as fruits and vegetables, clothing, furniture, automobiles, and other products containing visual elements that can greatly affect how people view and react to such displays. One example is a tenet of theatrical lighting design that strong green light on the human body (even if the overall lighting effect is white light) tends to make the human look unnatural, creepy, and often a little disgusting. Thus, variations in the color temperature of lighting can affect how appealing or attractive such a display may be to customers.

Moreover, the ability to view a decoratively colored item, such as fabric-covered furniture, clothing, paint, wallpaper, curtains, etc., in a lighting environment or color temperature condition which matches or closely approximates the conditions under which the item will be viewed would permit such colored items to be more accurately matched and coordinated. Typically, the lighting used in a display setting, such as a showroom, cannot be varied and is often chosen to highlight a particular facet of the color of the item leaving a purchaser to guess as to whether the item in question will retain an attractive appearance under the lighting conditions where the item will eventually be placed. Differences in lighting can also leave a customer wondering whether the color of the item will clash with other items that cannot conveniently be viewed under identical lighting conditions or otherwise directly compared.

In addition to white light, the ability to generate specific colors of light is also highly sought after. Because of humans' light sensitivity, visual arts and similar professions desire colored light that is specifiable and reproducible. Elementary film study classes teach that a movie-goer has been trained that light which is generally more orange or red signifies the morning, while light that is generally more blue signifies a night or evening. We have also been trained that sunlight filtered through water has a certain color, while sunlight filtered through glass has a different color. For all these reasons it is desirable for those involved in visual arts to be able to produce exact colors of light, and to be able to reproduce them later.

Current lighting technology makes such adjustment and control difficult, because common sources of light, such as halogen, incandescent, and fluorescent sources, generate light of a fixed color temperature and spectrum. Further, altering the color temperature or spectrum will usually alter other lighting variables in an undesirable way. For example, increasing the voltage applied to an incandescent light may raise the color temperature of the resulting light, but also results in an overall increase in brightness. In the same way, placing a deep blue filter in front of a white halogen lamp will dramatically decrease the overall brightness of the light. The filter itself will also get quite hot (and potentially melt) as it absorbs a large percentage of the light energy from the white light.

Moreover, achieving certain color conditions with incandescent sources can be difficult or impossible as the desired color may cause the filament to rapidly burn out. For fluorescent lighting sources, the color temperature is controlled by the composition of the phosphor, which may vary from bulb to bulb but cannot typically be altered for a given bulb. Thus, modulating color temperature of light is a complex procedure that is often avoided in scenarios where such adjustment may be beneficial.

In artificial lighting, control over the range of colors that can be produced by a lighting fixture is desirable. Many lighting fixtures known in the art can only produce as a single color of light instead of range of colors. That color may vary across lighting fixtures (for instance a fluorescent lighting fixture produces a different color of light from a sodium vapor lamp). The use of filters on a lighting fixture does not enable a lighting fixture to produce a range of colors, it merely allows a lighting fixture to produce its single color, which is then partially absorbed and partially transmitted by the filter. Once the filter is placed, the fixture can only produce a single (now different) color of light, it still cannot produce a range.

In control of artificial lighting, it is further desirable to be able to specify a point within the range of color producible by a lighting fixture which will be the point of highest intensity. Even on current technology lighting fixtures whose colors can be altered, the point of maximum intensity cannot be specified by the user, but is usually determined by unalterable physical characteristics of the fixture. Thus, an incandescent light fixture can produce a range of colors, but the intensity necessarily increases as the color temperature increases which does not enable control of the color at the point of maximum intensity. Filters further lack control of the point of maximum intensity as the point of maximum intensity of a lighting fixture will be the unfiltered color as any filter absorbs some of the intensity.

SUMMARY OF THE INVENTION

The present invention relates to systems and methods for generating and/or modulating illumination conditions to generate light of a desired and controllable color, for creating lighting fixtures for producing light in desirable and reproducible colors, and for modifying the color temperature or color shade of light produced by a lighting fixture within a prespecified range after a lighting fixture is constructed. In one embodiment, LED lighting units capable of generating light of a range of colors are used to provide light or supplement ambient light to afford lighting conditions suitable for a wide range of applications.

Disclosed is a first embodiment which comprises a lighting fixture for generating white light including a plurality of component illumination sources (such as LEDs), producing electromagnetic radiation of at least two different spectrums (including embodiments with exactly two or exactly three), each of the spectrums having a maximum spectral peak outside the region 510 nm to 570 nm, the illumination sources mounted on a mounting allowing the spectrums to mix so that the resulting spectrum is substantially continuous in the photopic response of the human eye and/or in the wavelengths from 400 nm to 700 nm.

In an embodiment, the lighting fixture can include illumination sources that are not LEDs possibly with a maximum spectral peak within the region 510 $\mu$m to 570 nm. In another embodiment the fixture can produce white light within a range of color temperatures such as, but not limited to, the range 500K to 10,000K and the range 2300 K to 4500 K. The specific color in the range may be controlled by a controller. In an embodiment the fixture contains a filter on at least one of the illumination sources which may be selected, possibly from a range of filters, to allow the fixture to produce a particular range of colors. The lighting fixture may also include in one embodiment illumination sources with wavelengths outside the above discussed 400 nm to 700 nm range.

In another embodiment, the lighting fixture can comprise a plurality of LEDs producing three spectrums of electromagnetic radiation with maximum spectral peaks outside the region of 530 $\mu$m, to 570 nm (such as 450 nm and/or 592 nm) where the additive interference of the spectrums results in white light. The lighting fixture may produce white light within a range of color temperatures such as, but not limited to, the range 500K to 10,000K and the range 2300 K to 4500 K. The lighting fixture may include a controller and/or a processor for controlling the intensities of the LEDs to produce various color temperatures in the range.

Another embodiment comprises a lighting fixture to be used in a lamp designed to take fluorescent tubes the lighting fixture having at least one component illumination source (often two or more) such as LEDs mounted on a mounting, and having a connector on the mounting that can couple to a fluorescent lamp and receive power from the lamp. It also contains a control or electrical circuit to enable the ballast voltage of the lamp to be used to power or control the LEDs. This control circuit could include a processor, and/or could control the illumination provided by the fixture based on the power provided to the lamp. The lighting fixture, in one embodiment, is contained in a housing, the housing could be generally cylindrical in shape, could contain a filter, and/or could be partially transparent or translucent. The fixture could produce white, or other colored, light.

Another embodiment comprises a lighting fixture for generating white light including a plurality of component illumination sources (such as LEDs, illumination devices containing a phosphor, or LEDs containing a phosphor), including component illumination sources producing spectrums of electromagnetic radiation. The component illumination source being mounted on a mounting designed to allow the spectrums to mix and form a resulting spectrum, wherein the resulting spectrum has intensity greater than background noise at its lowest valley. The lowest spectral valley within the visible range can also have an intensity of at least 5%, 10%, 25%, 50%, or 75% of the intensity of its maximum spectral peak. The lighting fixture may be able to generate white light at a range of color temperatures and may include a controller and/or processor for enabling the selection of a particular color in that range.

Another embodiment of a lighting fixture could include a plurality of component illumination sources (such as LEDs), the component illumination sources producing electromagnetic radiation of at least two different spectrums, the illumination sources being mounted on a mounting designed to allow the spectrums to mix and form a resulting spectrum, wherein the resulting spectrum does not have a spectral valley at a longer wavelength than the maximum spectral peak within the photopic response of the human eye and/or in the area from 400 nm to 700 mm.

Another embodiment comprises a method for generating white light including the steps of mounting a plurality of component illumination sources producing electromagnetic radiation of at least two different spectrums in such a way as to mix the spectrums; and choosing the spectrums in such a way that the mix of the spectrums has intensity greater than background noise at its lowest spectral valley.

Another embodiment comprises a system for controlling illumination conditions including, a lighting fixture for providing illumination of any of a range of colors, the lighting fixture being constructed of a plurality of component illumination sources (such as LEDs and/or potentially of three different colors), a processor coupled to the lighting fixture for controlling the lighting fixture, and a controller coupled to the processor for specifying illumination conditions to be provided by the lighting fixture. The controller could be computer hardware or computer software; a sensor such as, but not limited to a photodiode, a radiometer, a photometer, a colorimeter, a spectral radiometer, a camera; or a manual interface such as, but not limited to, a slider, a dial, a joystick, a trackpad, or a trackball. The processor could include a memory (such as a database) of predetermined color conditions and/or an interface-providing mechanism for providing a user interface potentially including a color spectrum, a color temperature spectrum, or a chromaticity diagram.

In another embodiment the system could include a second source of illumination such as, but not limited to, a florescent bulb, an incandescent bulb, a mercury vapor lamp, a sodium vapor lamp, an arc discharge lamp, sunlight, moonlight, candlelight, an LED display system, an LED, or a lighting system controlled by pulse width modulation. The second source could be used by the controller to specify illumination conditions for the lighting fixture based on the illumination of the lighting fixture and the second source of illumination and/or the combined light from the lighting fixture and the second source could be a desired color temperature.

Another embodiment comprises a method with steps including generating light having color and brightness using a lighting fixture capable of generating light of any of a range of colors, measuring illumination conditions, and modulating the color or brightness of the generated light to achieve a target illumination condition. The measuring of illumination conditions could include detecting color characteristics of the illumination conditions using a light sensor such as, but not limited to, a photodiode, a radiometer, a photometer, a calorimeter, a spectral radiometer, or a camera; visually evaluating illumination conditions, and modulating the color or brightness of the generated light includes varying the color or brightness of the generated light using a manual interface; or measuring illumination conditions including detecting color characteristics of the illumination conditions using a light sensor, and modulating the color or brightness of the generated light including varying the color or brightness of the generated light using a processor until color characteristics of the illumination conditions detected by the light sensor match color characteristics of the target illumination conditions. The method could include selecting a target illumination condition such as, but not limited to, selecting a target color temperature and/or providing an interface comprising a depiction of a color range and selecting a color within the color range. The method could also have steps for providing a second source of illumination, such as, but not limited to, a fluorescent bulb, an incandescent bulb, a mercury vapor lamp, a sodium vapor lamp, an arc discharge lamp, sunlight, moonlight, candlelight, an LED lighting system, an LED, or a lighting system controlled by pulse width modulation. The method could measure illumination conditions including detecting light generated by the lighting fixture and by the second source of illumination.

In another embodiment modulating the color or brightness of the generated light includes varying the illumination conditions to achieve a target color temperature or the lighting fixture could comprise one of a plurality of lighting fixtures, capable of generating a range of colors.

In yet another embodiment there is a method for designing a lighting fixture comprising, selecting a desired range of colors to be produced by the lighting fixture, choosing a selected color of light to be produced by the lighting fixture when the lighting fixture is at maximum intensity, and designing the lighting fixture from a plurality of illumination sources (such as LEDs) such that the lighting fixture can produce the range of colors, and produces the selected color when at maximum intensity.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way. The invention will be appreciated more fully from the following further description thereof, with reference to the accompanying drawings, wherein:

FIG. 10b depicts a close up of a control unit such as the one used in FIG. 10a.

DETAILED DESCRIPTION OF THE ILLUSTRATED EMBODIMENTS

Figure 1:
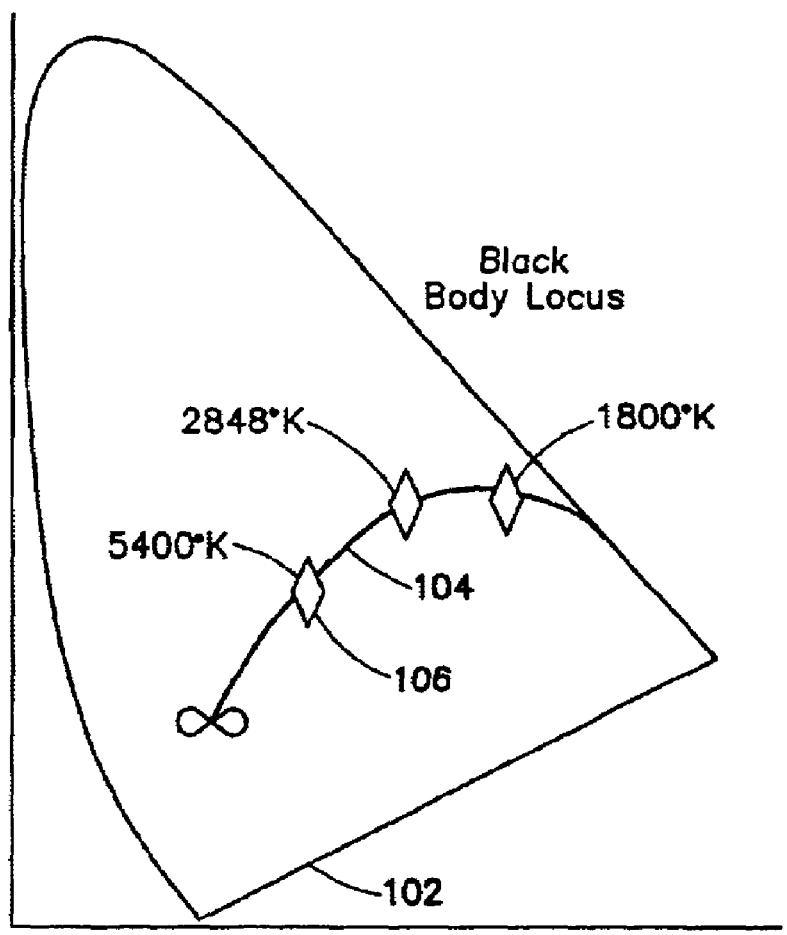
FIG. 1 is a chromaticity diagram including the black body locus.

The description below pertains to several illustrative embodiments of the invention. Although many variations of the invention may be envisioned by one skilled in the art, such variations and improvements are intended to fall within the scope of this disclosure. Thus, the scope of the invention is not to be limited in any way by the disclosure below.

As used in this document, the following terms generally have the following meanings; however, these definitions are in no way intended to limit the scope of the term as would be understood by one of skill in the art.

The term "LED" generally includes light emitting diodes of all types and also includes, but is not limited to, light emitting polymers, semiconductor dies that produce light in response to a current, organic LEDs, electron luminescent strips, super luminescent diodes (SLDs) and other such devices. The term LEDs does not restrict the physical or electrical packaging of any of the above and that packaging could include, but is not limited to, surface mount, chip-on-board, or T-package mount LEDs.

"Illumination source" includes all illumination sources, including, but not limited to, LEDs; incandescent sources including filament lamps; pyro-luminescent sources such as flames; candle-luminescent sources such as gas mantles and carbon arc radiation sources; photo-luminescent sources including gaseous discharges; fluorescent sources; phosphorescence sources; lasers; electro-luminescent sources such as electro-luminescent lamps; cathode luminescent sources using electronic satiation; and miscellaneous luminescent sources including galvano-luminescent sources, crystallo-luminescent sources, kine-luminescent sources, thermo-luminescent sources, tribo-luminescent sources, sono-luminescent sources, and radio-luminescent sources. Illumination sources may also include luminescent polymers. An illumination source can produce electromagnetic radiation within the visible spectrum, outside the visible spectrum, or a combination of both. A component illumination source is any illumination source that is part of a lighting fixture.

"Lighting fixture" or "fixture" is any device or housing containing at least one illumination source for the purposes of providing illumination.

"Color," "temperature" and "spectrum" are used interchangeably within this document unless otherwise indicated. The three terms generally refer to the resultant combination of wavelengths of light that result in the light produced by a lighting fixture. That combination of wavelengths defines a color or temperature of the light. Color is generally used for light which is not white while temperature is for light that is white, but either term could be used for any type of light. A white light has a color and a non-white light could have a temperature. A spectrum will generally refer to the spectral composition of a combination of the individual wavelengths, while a color or temperature will generally refer to the human perceived properties of that light. However, the above usages are not intended to limit the scope of these terms.

The recent advent of colored LEDs bright enough to provide illumination has prompted a revolution in illumination technology because of the ease with which the color and brightness of these light sources may be modulated. One such modulation method is discussed in U.S. Pat. No. 6,016,038 the entire disclosure of which is herein incorporated by reference. The systems and methods described herein discuss how to use and build LED light fixtures or systems, or other light fixtures or systems utilizing component illumination sources. These systems have certain advantages over other lighting fixtures. In particular, the systems disclosed herein enable previously unknown control in the light which can be produced by a lighting fixture. In particular, the following disclosure discusses systems and methods for the predetermination of the range of light, and type of light, that can be produced by a lighting fixture and the systems and methods for utilizing the predetermined range of that lighting fixture in a variety of applications.

Figure 2:
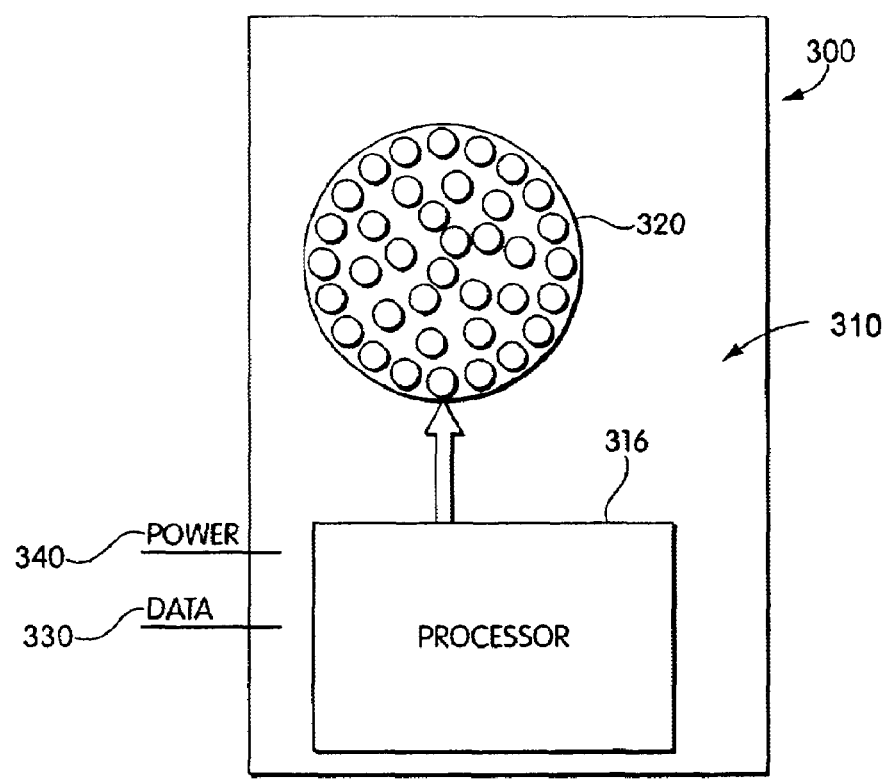
FIG. 2 depicts an embodiment of a lighting fixture suitable for use in this invention.

To understand these systems and methods it is first useful to understand a lighting fixture which could be built and used in embodiments of this invention. FIG. 2 depicts one embodiment of a lighting module which could be used in one embodiment of the invention, a lighting fixture (300) is depicted in block diagram format. The lighting fixture (300) includes two components, a processor (316) and a collection of component illumination sources (320), which is depicted in FIG. 2 as an array of light emitting diodes. In one embodiment of the invention, the collection of component illumination sources comprises at least two illumination sources that produce different spectrums of light. The collection of component illumination sources (320) are arranged within said lighting fixture (300) on a mounting (310) in such a way that the light from the different component illumination sources is allowed to mix to produce a resultant spectrum of light which is basically the additive spectrum of the different component illumination sources. In FIG. 2, this is done my placing the component illumination sources (320) in a generally circular area, it could also be done in any other manner as would be understood by one of skill in the art, such as a line of component illumination sources, or another geometric shape of component illumination sources. The term "processor" is used herein to refer to any method or system for processing, for example, those that process in response to a signal or data and/or those that process autonomously. A processor should be understood to encompass microprocessors, microcontrollers, programmable digital signal processors, integrated circuits, computer software, computer hardware, electrical circuits, application specific integrated circuits, programmable logic devices, programmable gate arrays, programmable array logic, personal computers, chips, and any other combination of discrete analog, digital, or programmable components, or other devices capable of providing processing functions.

The collection of illumination sources (320) is controlled by the processor (316) to produce controlled illumination. In particular, the processor (316) controls the intensity of different color individual LEDs in the array of LEDs, composing the collection of illumination sources (320) to produce illumination in any color within a range bounded by the spectra of the individual LEDs and any filters or other spectrum-altering devices associated therewith. Instantaneous changes in color, strobing and other effects, can also be produced with lighting fixtures such as the light module (300) depicted in FIG. 2. The lighting fixture (300) may be made capable of receiving power and data from an external source in one embodiment of the invention. The receipt of such data being over data line (330) and power over power line (340). The lighting fixture (300), through the processor (316), may be made to provide the various functions ascribed to the various embodiments of the invention disclosed herein. In another embodiment, the processor (316) may be replaced by hard wiring or another type of control whereby the lighting fixture (300) produces only a single color of light.

Figure 3:
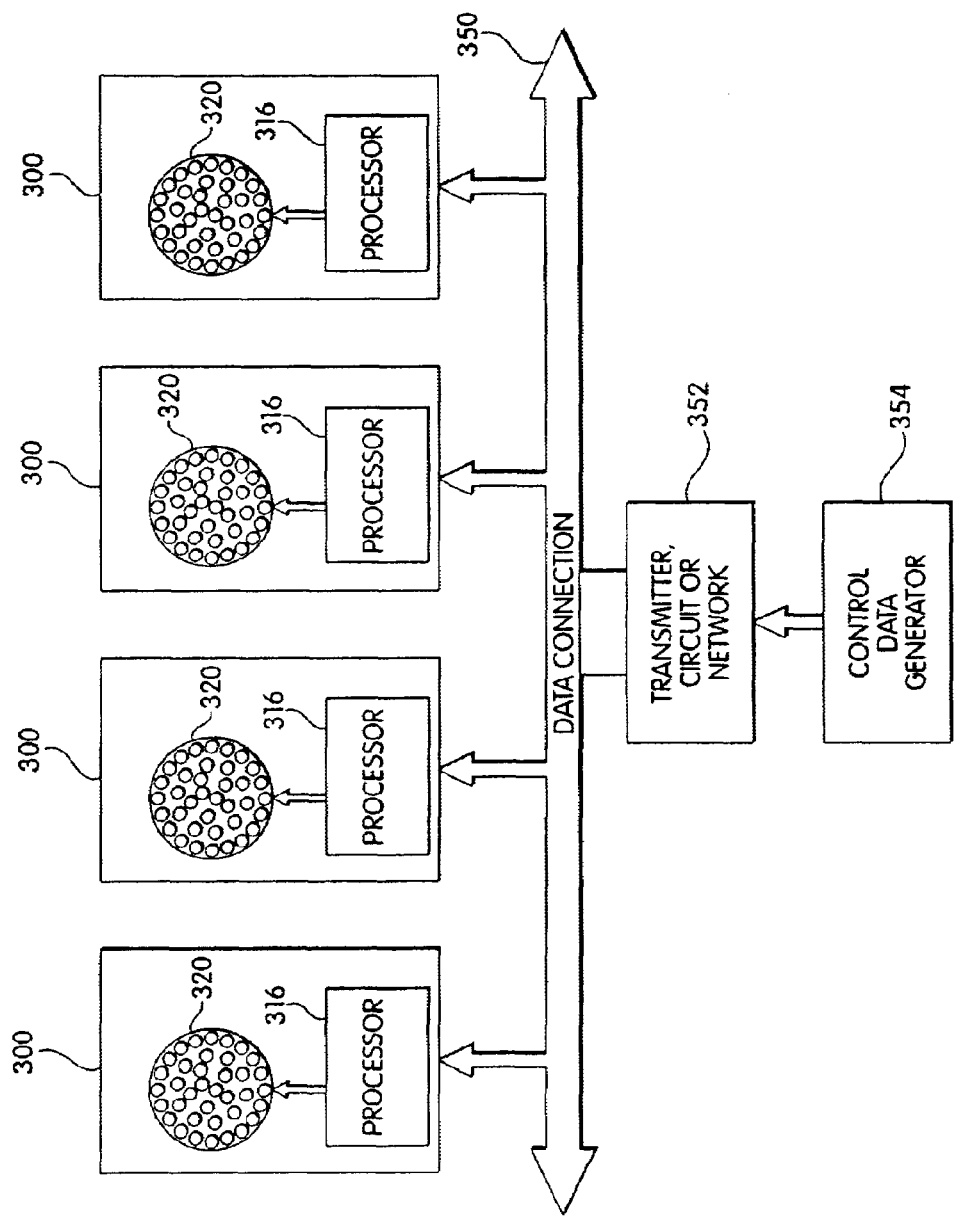
FIG. 3 depicts the use of multiple lighting fixtures according to one embodiment of the invention.

Referring to FIG. 3, the lighting fixture (300) may be constructed to be used either alone or as part of a set of such lighting fixtures (300). An individual lighting fixture (300) or a set of lighting fixtures (300) can be provided with a data connection (350) to one or more external devices, or, in certain embodiments of the invention, with other light modules (300). As used herein, the term "data connection" should be understood to encompass any system for delivering data, such as a network, a data bus, a wire, a transmitter and receiver, a circuit, a video tape, a compact disc, a DVD disc, a video tape, an audio tape, a computer tape, a card, or the like. A data connection may thus include any system or method to deliver data by radio frequency, ultrasonic, auditory, infrared, optical, microwave, laser, electromagnetic, or other transmission or connection method or system. That is, any use of the electromagnetic spectrum or other energy transmission mechanism could provide a data connection as disclosed herein. In an embodiment of the invention, the lighting fixture (300) may be equipped with a transmitter, receiver, or both to facilitate communication, and the processor (316) may be programmed to control the communication capabilities in a conventional manner. The light fixtures (300) may receive data over the data connection (350) from a transmitter (352), which may be a conventional transmitter of a communications signal, or may be part of a circuit or network connected to the lighting fixture (300). That is, the transmitter (352) should be understood to encompass any device or method for transmitting data to the light fixture (300). The transmitter (352) may be linked to or be part of a control device (354) that generates control data for controlling the light modules (300). In one embodiment of the invention, the control device (354) is a computer, such as a laptop computer. The control data may be in any form suitable for controlling the processor (316) to control the collection of component illumination sources (320). In one embodiment of the invention, the control data is formatted according to the DMX-512 protocol, and conventional software for generating DMX-512 instructions is used on a laptop or personal computer as the control device (354) to control the lighting fixtures (300). The lighting fixture (300) may also be provided with memory for storing instructions to control the processor (316), so that the lighting fixture (300) may act in stand alone mode according to pre-programmed instructions.

Figure 4:
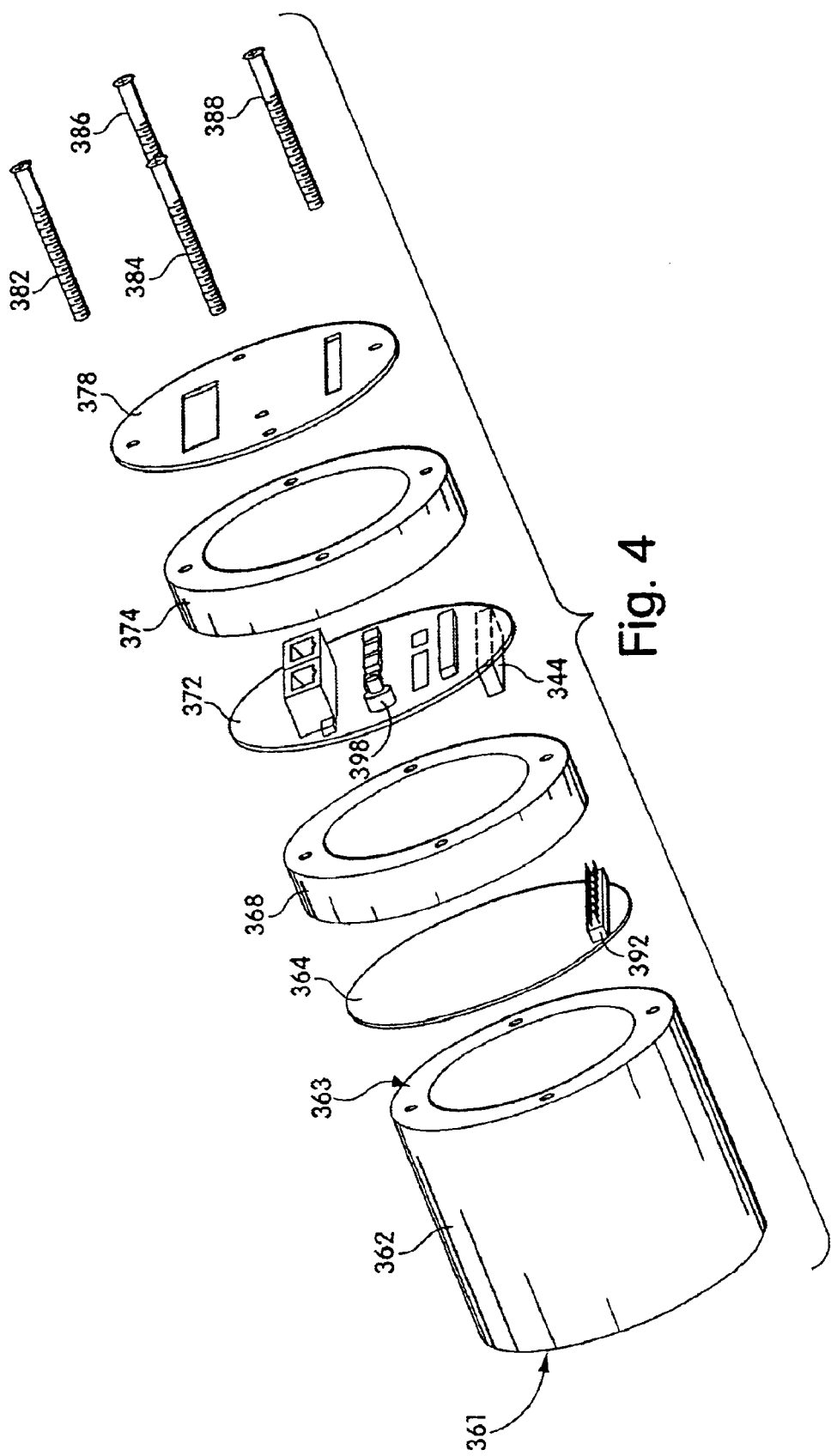
FIG. 4 depicts an embodiment of a housing for use in one embodiment of this invention.

The foregoing embodiments of a lighting fixture (300) will generally reside in one of any number of different housings. Such, housing is, however, not necessary, and the lighting fixture (300) could be used without a housing to still form a lighting fixture. A housing may provide for lensing of the resultant light produced and may provide protection of the lighting fixture (300) and its components. A housing may be included in a lighting fixture as this term is used throughout this document. FIG. 4 shows an exploded view of one embodiment of a lighting fixture of the present invention. The depicted embodiment comprises a substantially cylindrical body section (362), a lighting fixture (364), a conductive sleeve (368), a power module (372), a second conductive sleeve (374), and an enclosure plate (378). It is to be assumed here that the lighting fixture (364) and the power module (372) contain the electrical structure and software of lighting fixture (300) a different power module and lighting, fixture (300) as known to the art, or as described in U.S. patent application Ser. No. 09/215,624 the entire disclosure of which is herein incorporated by reference. Screws (382), (384), (386), (388) allow the entire apparatus to be mechanically connected. Body section (362), conductive sleeves (368) and (374) and enclosure plate (378) are preferably made from a material that conducts heat, such as aluminum. Body section (362) has an emission end (361), a reflective interior portion (not shown) and an illumination end (363). Lighting module (364) is mechanically affixed to said illumination end (363). Said emission end (361) may be open, or, in one embodiment may have affixed thereto a filter (391). Filter (391) may be a clear filter, a diffusing filter, a colored filter, or any other type of tilter known to the art. In one embodiment, the filter will be permanently attached to the body section (362), but in other embodiments, the filter could be removably attached. In a still further embodiment, the filter (391), need not be attached to the emission end (361) of body portion (362) but may be inserted anywhere in the direction of light emission from the lighting fixture (364). Lighting fixture (364) may be disk-shaped with two sides. The illumination side (not shown) comprises a plurality of component light sources which produce a predetermined selection of different spectrums of light. The connection side may hold an electrical connector male pin assembly (392). Both the illumination side and the connection side can be coated with aluminum surfaces to better allow the conduction of heat outward from the plurality of component light sources to the body section (362). Likewise, power module (372) is generally disk shaped and may have every available surface covered with aluminum for the same reason. Power module (372) has a connection side holding an electrical connector female pin assembly (394) adapted to fit the pins from assembly (392). Power module (372) has a power terminal side holding a terminal (398) for connection to a source of power such as an AC or DC electrical source. Any standard AC or DC jack may be used, as appropriate.

Interposed between lighting fixture (362) and power module (372) is a conductive aluminum sleeve (368), which substantially encloses the space between modules (362) and (372). As shown, a disk-shaped enclosure plate (378) and screws (382), (384), (386) and (388) can seal all of the components together, and conductive sleeve (374) is thus interposed between enclosure plate (378) and power module (372). Alternatively, a method of connection other than screws (382), (384), (386), and (388) may be used to seal the structure together. Once sealed together as a unit, the lighting fixture (362) may be connected to a data network as described above and may be mounted in any convenient manner to illuminate an area.

Figure 5A:
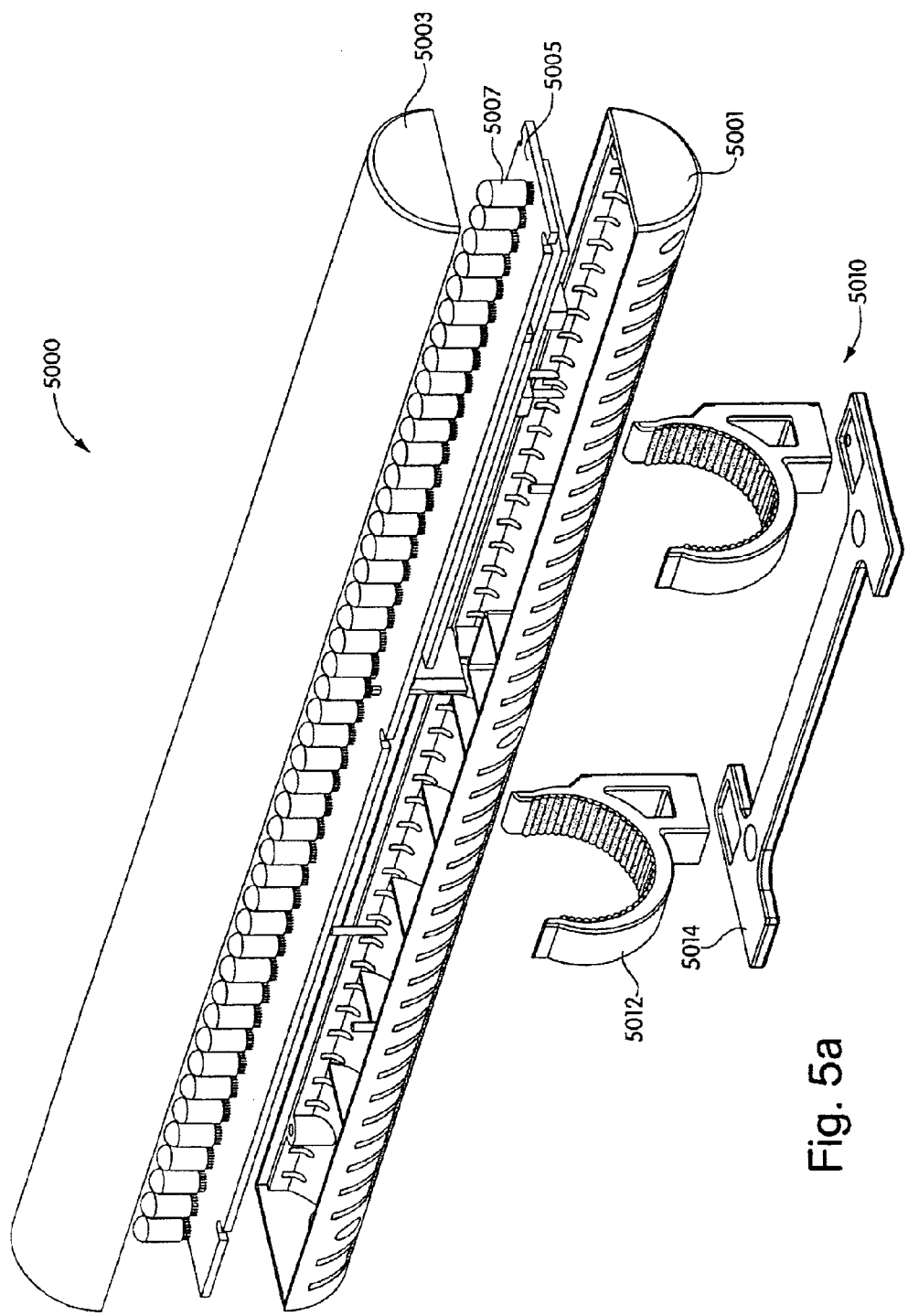
FIGS. 5a and 5b depict another embodiment of a housing for use in one embodiment of this invention.
Figure 5B:
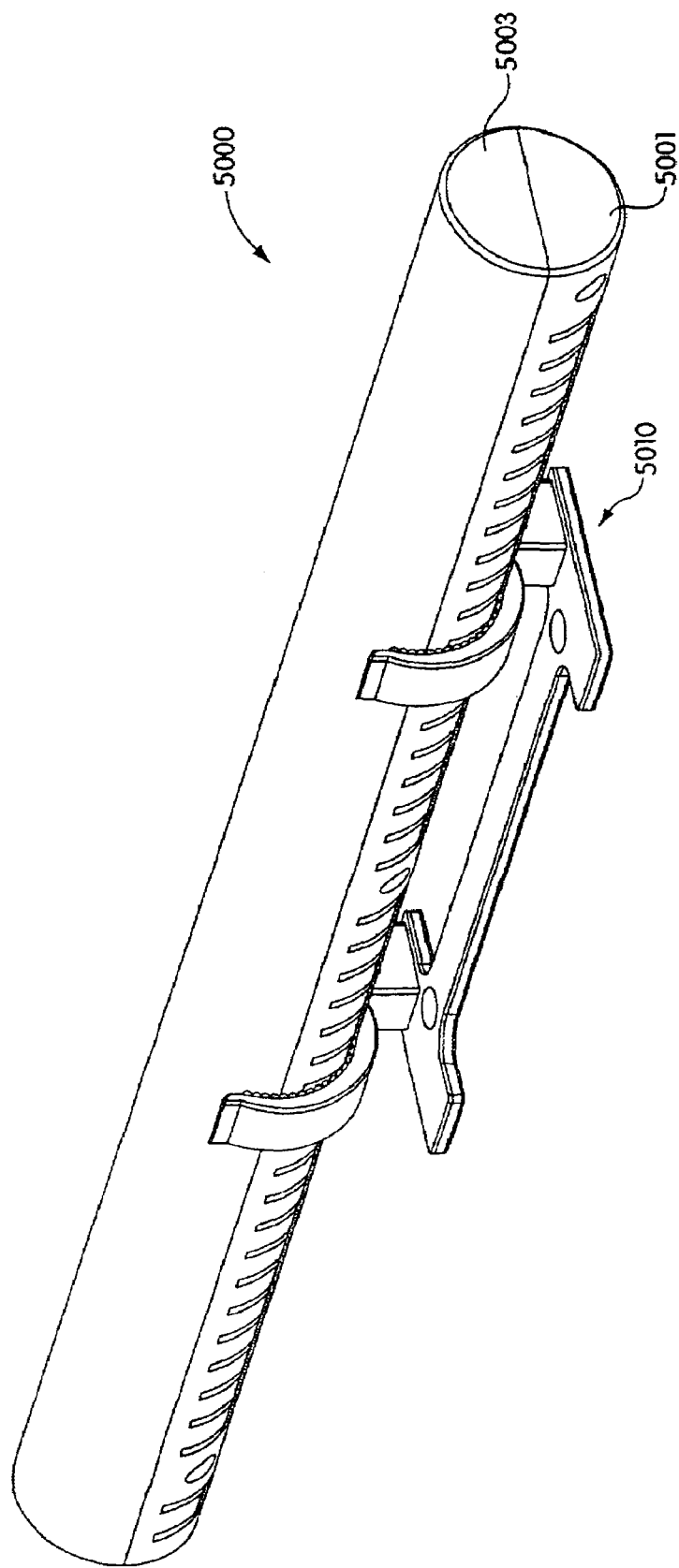

FIGS. 5a and 5b show an alternative lighting fixture including a housing that could be used in another embodiment of the invention. The depicted embodiment comprises a lower body section (5001), an upper body section (5003) and a lighting fixture (5005). Again, the lighting fixture can contain the lighting fixture (300), a different lighting fixture known to the art, or a lighting fixture described anywhere else in this document. The lighting fixture (5005) shown here is designed to have a linear track of component illumination devices (in this case LEDs (5007)) although such a design is not necessary. Such a design is desirable for an embodiment of the invention, however. In addition, the linear track of component illumination sources in depicted in FIG. 5a as a single track, multiple linear tracks could be used as would be understood by one of skill in the art. In one embodiment of the invention, the upper body section (5003) can comprises a filter as was discussed above, or may be translucent, transparent, semi-translucent, or semi-transparent. Further shown in FIG. 5a is the optional holder (5010) which may be used to hold the lighting fixture (5000). This holder (5010) comprises clip attachments (5012) which may be used to frictionally engage the lighting fixture (5000) to enable a particular alignment of lighting fixture (5000) relative to the holder (5010). The mounting also contains attachment plate (5014) which may be attached to the clip attachments (5012) by any type of attachment known to the art whether permanent, removable, or temporary. Attachment plate (5014) may then be used to attach the entire apparatus to a surface such as, but not limited to, a wall or ceiling.

In one embodiment, the lighting fixture (5000) is generally cylindrical in shape when assembled (as shown in FIG. 5b) and therefore can move or "roll" on a surface. In addition, in one embodiment, the lighting fixture (5000) only can emit light through the upper body section (5003) and not through the lower body section (5001). Without a holder (5010), directing the light emitted from such a lighting fixture (5000) could be difficult and motion could cause the directionality of the light to undesirably alter.

In one embodiment of the invention, it is recognized, that prespecified ranges of available colors may be desirable and it may also be desirable to build lighting fixtures in such a way as to maximize the illumination of the lighting apparatus for particular color therein. This is best shown through a numerical example. Let us assume that a lighting fixture contains 30 component illumination sources in three different wavelengths, primary red, primary blue, and primary green (such as individual LEDs). In addition, let us assume that each of these illumination sources produces the same intensity of light, they just produce at different colors. Now, there are multiple different ways that the thirty illumination sources for any given lighting fixture can be chosen. There could be of each of the illumination sources, or alternatively there could be 30 primary blue colored illumination sources. It should be readily apparent that these light fixtures would be useful for different types of lighting. The second light apparatus produces more intense primary blue light (there are 30 sources of blue light) than the first light source (which only has 10 primary blue light sources, the remaining 20 light sources have to be off to produce primary blue light), but is limited to only producing primary blue light. The second light fixture can produce more colors of light, because the spectrums of the component illumination sources can be mixed in different percentages, but cannot produce as intense blue light. It should be readily apparent from this example that the selection of the individual component illumination sources can change the resultant spectrum of light the fixture can produce. It should also be apparent that the same selection of components can produce lights which can produce the same colors, but can produce those colors at different intensities. To put this another way, the full-on point of a lighting fixture (the point where all the component illumination sources are at maximum) will be different depending on what the component illumination sources are.

A lighting system may accordingly be specified using a full-on point and a range of selectable colors. This system has may potential applications such as, but not limited to, retail display lighting and theater lighting. Often times numerous lighting fixtures of a plurality of different colors are used to present a stage or other area with interesting shadows and desirable features. Problems can arise, however, because lamps used regularly have similar intensities before lighting filters are used to specify colors of those fixtures, due to differences in transmission of the various filters (for instance blue filters often loose significantly more intensity than red filters), lighting fixtures must have their intensity controlled to compensate. For this reason, lighting fixtures are often operated at less than their full capability (to allow mixing) requiring additional lighting fixtures to be used. With the lighting fixtures of the instant invention, the lighting fixtures can be designed which produce particular colors at identical intensities of chosen colors when operating at their full potential, this can allow easier mixing of the resultant light, and can result in more options for a lighting design scheme.

Such a system enables the person building or designing lighting fixtures to generate lights that can produce a preselected range of colors, while still maximizing the intensity of light at certain most desirable color. These lighting fixtures would therefore allow a user to select certain color(s) of lighting fixtures for an application independent of relative intensity. The lighting fixtures can then be built so that the intensities at these colors are the same. Only the spectrum is altered. It also enables a user to select lighting fixtures that produce a particular high-intensity color of light, and also have the ability to select nearby colors of light in a range.

The range of colors which can be produced by the lighting fixture can be specified instead of, or in addition to, the full-on point. The lighting fixture can then be provided with control systems that enable a user of the lighting fixture to intuitively and easily select a desired color from the available range.

Figure 6:
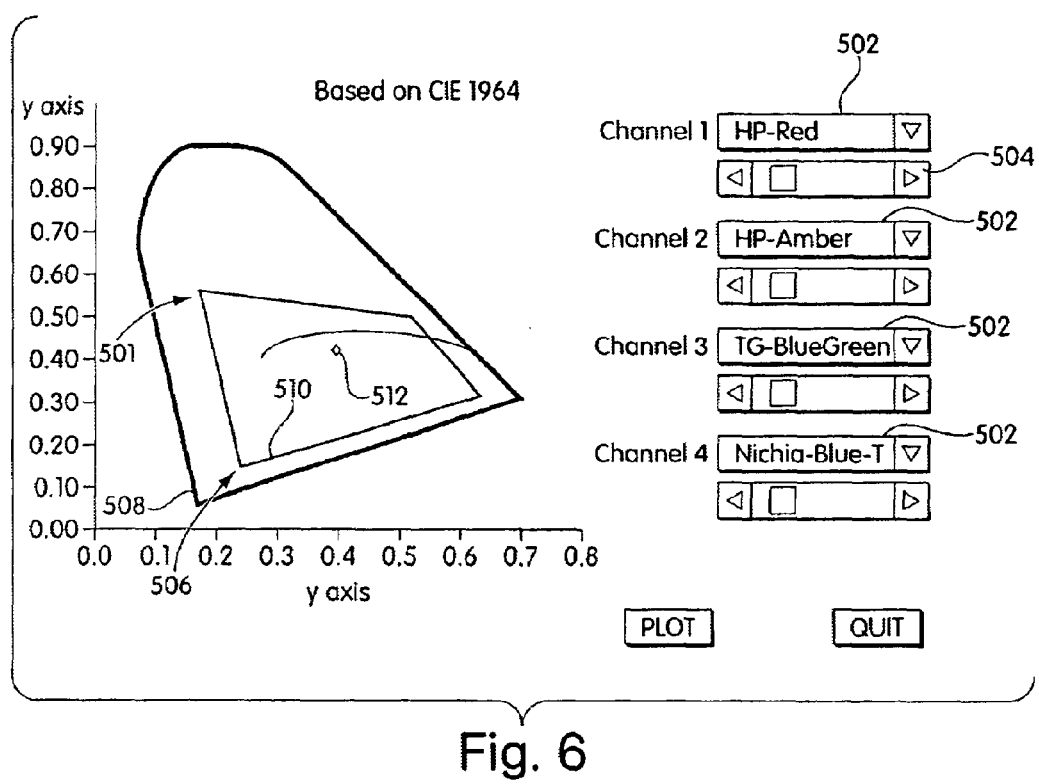
FIG. 6 depicts an embodiment of a computer interface enabling a user to design a lighting fixture capable of producing a desired spectrum.

One embodiment of such a system works by storing the spectrums of each of the component illumination sources. In this example embodiment, the illumination sources are LEDs. By selecting different component LEDs with different spectrums, the designer can define the color range of a lighting fixture. An easy way to visualize the color range is to use the CIE diagram which shows the entire lighting range of all colors of light which can exist. One embodiment of a system provides a light-authoring interface such as an interactive computer interface. FIG. 6 shows an embodiment of an interactive computer interface enabling a user to see a CIE diagram (508) on which is displayed the spectrum of color a lighting fixture can produce. In FIG. 6 individual LED spectra are saved in memory and can be recalled from memory to be used for calculating a combined color control area. The interface has several channels (502) for selecting LEDs. Once selected, varying the intensity slide bar (504) can change the relative number of LEDs of that type in the resultant lighting fixture. The color of each LED represented on a color chart such as a CIE diagram (508) as a point (for example, point (506)). A second LED can be selected on a different channel to create a second point (for example, point (509)) on the CIE chart. A line connecting these two points represents the extent that the color from these two LEDs can be mixed to produce additional colors. When a third and fourth channel are used, an area (510) can be plotted on the CIE diagram representing the possible combinations of the selected LEDs. Although the area (510) shown here is a polygon of four sides it would be understood by one of skill in the art that the area (510) could be a point line or a polygon with any number of sides depending on the LEDs chosen.

In addition to specifying the color range, the intensities at any given color can be calculated from the LED spectrums. By knowing the number of LEDs for a given color and the maximum intensity of any of these LEDs, the total light output at a particular color is calculated. A diamond or other symbol (512) may be plotted on the diagram to represent the color when all of the LEDs are on full brightness or the point may represent the present intensity setting.

Because a lighting fixture can be made of a plurality of component illumination sources, when designing a lighting fixture, a color that is most desirable can be selected, and a lighting fixture can be designed that maximizes the intensity of that color. Alternatively, a fixture may be chosen and the point of maximum intensity can be determined from this selection. A tool may be provided to allow calculation of a particular color at a maximum intensity. FIG. 6 shows such a tool as symbol (512), where the CIE diagram has been placed on a computer and calculations can be automatically performed to compute a total number of LEDs necessary to produce a particular intensity, as well as the ratio of LEDs of different spectrums to produce particular colors. Alternatively, a selection of LEDs may be chosen and the point of maximum intensity determined, both directions of calculation are included in embodiments of this invention.

In FIG. 6 as the number of LEDs are altered, the maximum intensity points move so that a user can design a light which has a maximum intensity at a desired point.

Therefore the system in one embodiment of the invention contains a collection of the spectrums of a number of different LEDs, provides an interface for a user to select LEDs that will produce a range of color that encloses the desirable area, and allows a user to select the number of each LED type such that when the unit is on full, a target color is produced. In an alternative embodiment, the user would simply need to provide a desired spectrum, or color and intensity, and the system could produce a lighting fixture which could generate light according to the requests.

Once the light has been designed, in one embodiment, it is further desirable to make the light's spectrum easily accessible to the lighting fixture's user. As was discussed above, the lighting fixture may have been chosen to have a particular array of illumination sources such that a particular color is obtained at maximum intensity. However, there may be other colors that can be produced by varying the relative intensities of the component illumination sources. The spectrum of the lighting fixture can be controlled within the predetermined range specified by the area (510). To control the lighting color within the range, it is recognized that each color within the polygon is the additive mix of the component LEDs with each color contained in the components having a varied intensity. That is to move from one point in FIG. 6 to a second point in FIG. 6, it is necessary to alter the relative intensities of the component LEDs. This may be less than intuitive for the final user of the lighting fixture who simply wants a particular color, or a particular transition between colors and does not know the relative intensities to shift to. This is particularly true if the LEDs used do not have spectra with a single well determined peak of color. A lighting fixture may be able to generate 100 shades of orange, but how to get to each of those shades may require control.

In order to be able to carry out such control of the spectrum of the light, it is desirable in one embodiment to create a system and method for linking the color of the light to a control device for controlling the light's color. Since a lighting fixture can be custom designed, it may, in one embodiment, be desirable to have the intensities of each of the component illumination sources "mapped" to a desirable resultant spectrum of light and allowing a point on the map to be selected by the controller. That is, a method whereby, with the specification of a particular color of light by a controller, the lighting fixture can turn on the appropriate illumination sources at the appropriate intensity to create that color of light. In one embodiment, the lighting fixture design software shown in FIG. 6 can be configured in such a way that it can generate a mapping between a desirable color that can be produced (within the area (510)), and the intensities of the component LEDs that make up the lighting fixture. This mapping will generally take one of two forms: 1) a lookup table, or 2) a parametric equation, although other forms could be used as would be known to one of skill in the art. Software on board the lighting fixture (such as in the processor (316) above) or on board a lighting controller, such as one of those known to the art, or described above, can be configured to accept the input of a user in selecting a color, and producing a desired light.

This mapping may be performed by a variety of methods. In one embodiment, statistics are known about each individual component illumination sources within the lighting fixture, so mathematical calculations may be made to produce a relationship between the resulting spectrum and the component spectrums. Such calculations would be well understood by one of skill in the art.

In another embodiment, an external calibration system may be used. One layout of such a system is disclosed in FIG. 7. Here the calibration system includes a lighting fixture (2010) that is connected to a processor (2020) and which receives input from a light sensor or transducer (2034). The processor (2020) may be processor (316) or may be an additional or alternative processor. The sensor (2034) measures color characteristics, and optionally brightness, of the light output by the lighting fixture (2010) and/or the ambient light, and the processor (2020) varies the output of the lighting fixture (2010). Between these two devices modulating the brightness or color of the output and measuring the brightness and color of the output, the lighting fixture can be calibrated where the relative settings of the component illumination sources (or processor settings (2020)) are directly related to the output of the fixture (2010) (the light sensor (2034) settings). Since the sensor (2034) can detect the net spectrum produced by the lighting fixture, it can be used to provide a direct mapping by relating the output of the lighting fixture to the settings of the component LEDs.

Once the mapping has been completed, other methods or systems may be used for the light fixture's control. Such methods or systems will enable the determination of a desired color, and the production by the lighting fixture of that color.

Figure 8A:
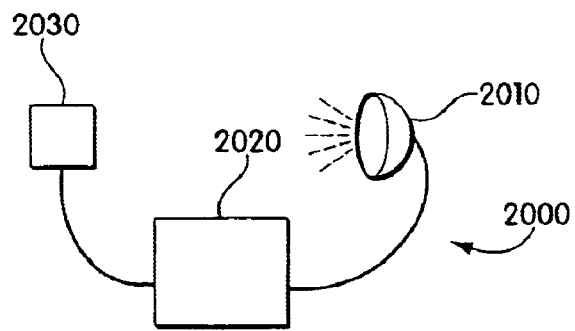
FIG. 8a shows a general embodiment of the control of a lighting fixture of this invention.

FIG. 8a shows one embodiment of the system (2000) where a control system (2030) may be used in conjunction with a lighting fixture (2010) to enable control of the lighting fixture (2010). The control system (2030) may be automatic, may accept input from a user, or may be any combination of these two. The system (2000) man also include a processor (2020) which may be processor (316) or another processor to enable the light to change color.

Figure 9:
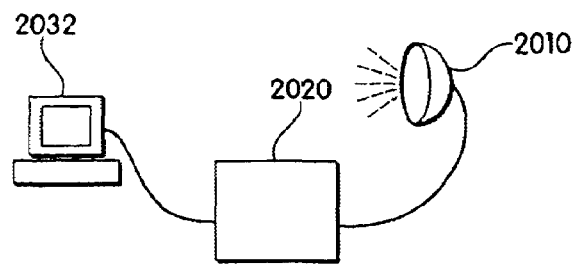
FIG. 9 shows an embodiment for controlling a light fixture of the invention using a computer interface.

FIG. 9 shows a more particular embodiment of a system (2000). A user computer interface control system (2032) with which a user may select a desired color of light is used as a control system (2030). The interface could enable any type of user interaction in the determination of color. For example, the interface many provide a palette chromaticity diagram or other color scheme from which a user may select a color e.g. by clicking with a mouse on a suitable color or color temperature on the interface, changing a variable using a keyboard, etc. The interface may include a display screen, a computer keyboard, a mouse, a trackpad, or any other suitable system for interaction between the processor and a user. In certain embodiments, the system may permit a user to select a set of colors for repeated use, capable of being rapidly accessed, e.g., by providing a simple code, such as a single letter or digit, or by selecting one of a set of preset colors through an interface as described above. In certain embodiments, the interface may also include a look-up table capable of correlating color names with approximate shades, converting color coordinates from one system. (e.g., RGB, CYM, YIQ, YUV, IISV, IILS, XYZ, etc.) to a different color coordinate system or to a display or illumination color, or any other conversion function for assisting a user in manipulating the illumination color. The interface may also include one or more closed-form equations for converting from, for example, a user-specified color temperature (associated with a particular color of white light) into suitable signals for the different component illumination sources of the lighting fixture (2010). The system may further include a sensor as discussed below for providing information to the processor (2020), e.g., for automatically calibrating the color of emitted light of the lighting fixture (2010) to achieve the color selected by the user on the interface.

Figure 10A:
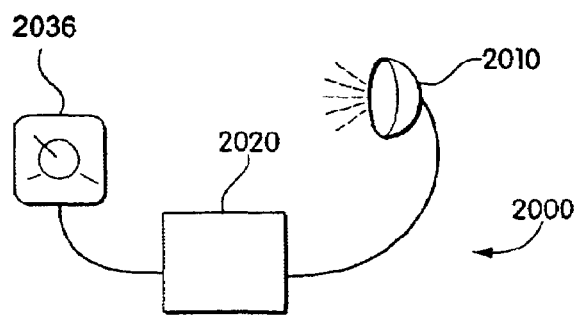
FIG. 10a shows another embodiment for controlling a lighting fixture of this invention using a manual control.

In another embodiment, a manual control system (2036) is used in the system (2000), as depicted in FIG. 10a, such as a dial, slider, switch, multipole switch, console, other lighting control unit, or any other controller or combination of controllers to permit a user to modify the illumination conditions until the illumination conditions or the appearance of a subject being illuminated is desirable. For example, a dial or slider may be used in a system to modulate the net color spectrum produced, the illumination along the color temperature curve, or any other modulation of the color of the lighting fixture. Alternatively, a joystick, trackball, trackpad, mouse, thumb-wheel, touch-sensitive surface, or a console with two or more sliders, dials, or other controls may be used to modulate the color, temperature, or spectrum. These manual controls may be used in conjunction with a computer interface control system (2032) as discussed above, or may be used independently, possibly with related markings to enable a user to scan through an available color range.

Figure 10B:
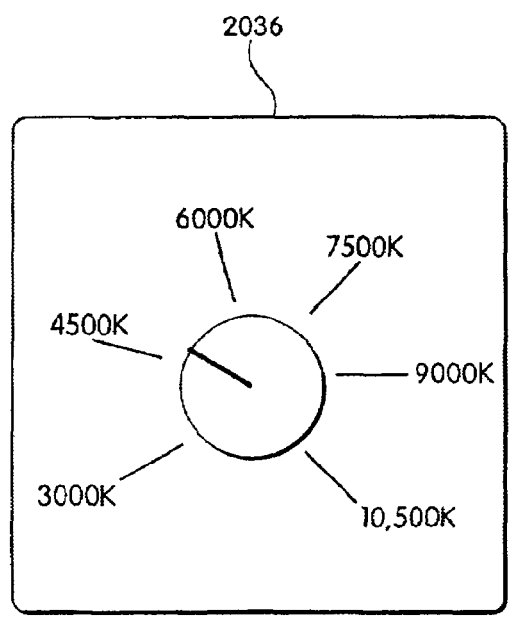

One such manual control system (2036) is in detail in FIG. 10b. The depicted control unit features a dial marked to indicate a range of color temperatures, e.g., from 3000K to 10,500K. This device would be useful on a lighting fixture used to produce a range of temperatures ("colors") of white light, such as the one discussed below. It would be understood by one of skill in the art that broader, narrower, or overlapping ranges may be employed, and a similar system could be employed to control lighting fixtures that can produce light of a spectrum beyond white, or not including white. A manual control system (2036) may be included as part of a processor controlling an array of lighting units, coupled to a processor, e.g., as a peripheral component of a lighting control system, disposed on a remote control capable of transmitting a signal, such as an infrared or microwave signal, to a system controlling a lighting unit, or employed or configured in any other manner, as will readily be understood by one of skill in the art. Additionally, instead of a dial, a manual control system (2036) may employ a slider, a mouse, or any other control or input device suitable for use in the systems and methods described herein.

Figure 7:
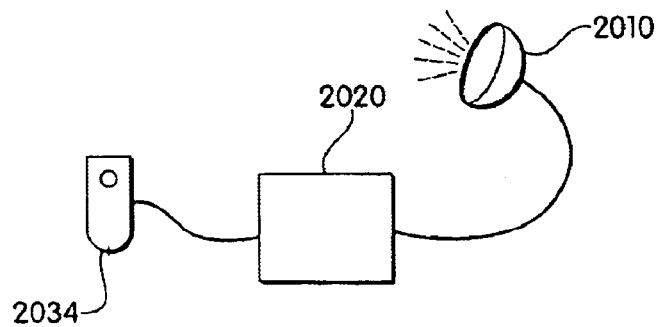
FIG. 7 shows an embodiment for calibrating or controlling the light fixture of the invention using a sensor.

In another embodiment, the calibration system depicted in FIG. 7 may function as a control system or as a portion of a control system. For instance a selected color could be input by the user and the calibration system could measure the spectrum of ambient light, compare the measured spectrum with the selected spectrum, adjust the color of light produced by the lighting fixture (2010), and repeat the procedure to minimize the difference between the desired spectrum and the measured spectrum. For example, if the measured spectrum is deficient in red wavelengths when compared with the target spectrum, the processor may increase the brightness of red LEDs in the lighting fixture, decrease the brightness of blue and green LEDs in the lighting fixture, or both, in order to minimize the difference between the measured spectrum and the target spectrum and potentially also achieve a target brightness (i.e. such as the maximum possible brightness of that color). The system could also be used to match a color produced by a lighting fixture to a color existing naturally. For instance, a film director could find light in a location where filming does not occur and measure that light using the sensor, this could than provide the desired color which is to be produced by the lighting fixture. In one embodiment, these tasks can be performed simultaneously (potentially using two separate sensors). In a yet further embodiment, the director can remotely measure a lighting condition with a sensor (2034) and store that lighting condition on memory associated with that sensor (2034). The sensor's memory may then be transferred at a later time to the processor (2020) which may set the lighting fixture to mimic the light recorded. This allows a director to create a "memory of desired lighting" which can be stored and recreated later by lighting fixtures such as those described above.

The sensor (2034) used to measure the illumination conditions may be a photodiode, a phototransistor, a photoresistor, a radiometer, a photometer, a calorimeter, a spectral radiometer, a camera, a combination of two or more of the preceding devices, or any other system capable of measuring the color or brightness of illumination conditions. An example of a sensor may be the IL2000 SpectroCube Spectroradiometer offered for sale by International Light Inc. although any other sensor may be used. A colorimeter or spectral radiometer is advantageous because a number of wavelengths can be simultaneously detected, permitting accurate measurements of color and brightness simultaneously. A color temperature sensor which may be employed in the systems and methods described herein is disclosed in U.S. Pat. No. 5,521,708.

In embodiments wherein the sensor (2034) detects an image, e.g., includes a camera or other video capture device, the processor (2020) may modulate the illumination conditions with the lighting fixture (2010) until an illuminated object appears substantially the same, e.g., of substantially the same color, as in a previously recorded image. Such a system simplifies procedures employed by cinematographers, for example, attempting to produce a consistent appearance of an object to promote continuity between scenes of a film, or by photographers, for example, trying to reproduce lighting conditions from an earlier shoot.

Figure 8B:
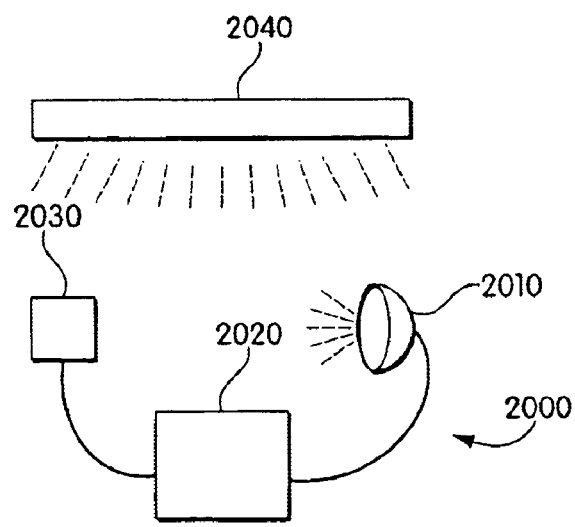
FIG. 8b shows one embodiment of the control of a lighting fixture of this invention in conjunction with a second source of light.

In certain embodiments, the lighting fixture (2010) may be used as the sole light source, while in other embodiments, such as is depicted in FIG. 8b, the lighting fixture (2010) may be used in combination with a second source of light (2040), such as an incandescent, fluorescent, halogen, other LED sources or component light sources (including those with and without control), lights that are controlled with pulse width modulation, sunlight, moonlight, candlelight, etc. This use can be to supplement the output of the second source. For example, a fluorescent light emitting illumination weak in red portions of the spectrum may be supplemented with an lighting fixture emitting primarily red wavelengths to provide illumination conditions more closely resembling natural sunlight. Similarly, such a system may also be useful in outdoor image capture situations, because the color temperature of natural light varies as the position of the sun changes. A lighting fixture (2010) may be used in conjunction with a sensor (2034) as controller (2030) to compensate for changes in sunlight to maintain constant illumination conditions for the duration of a session.

Figure 11:
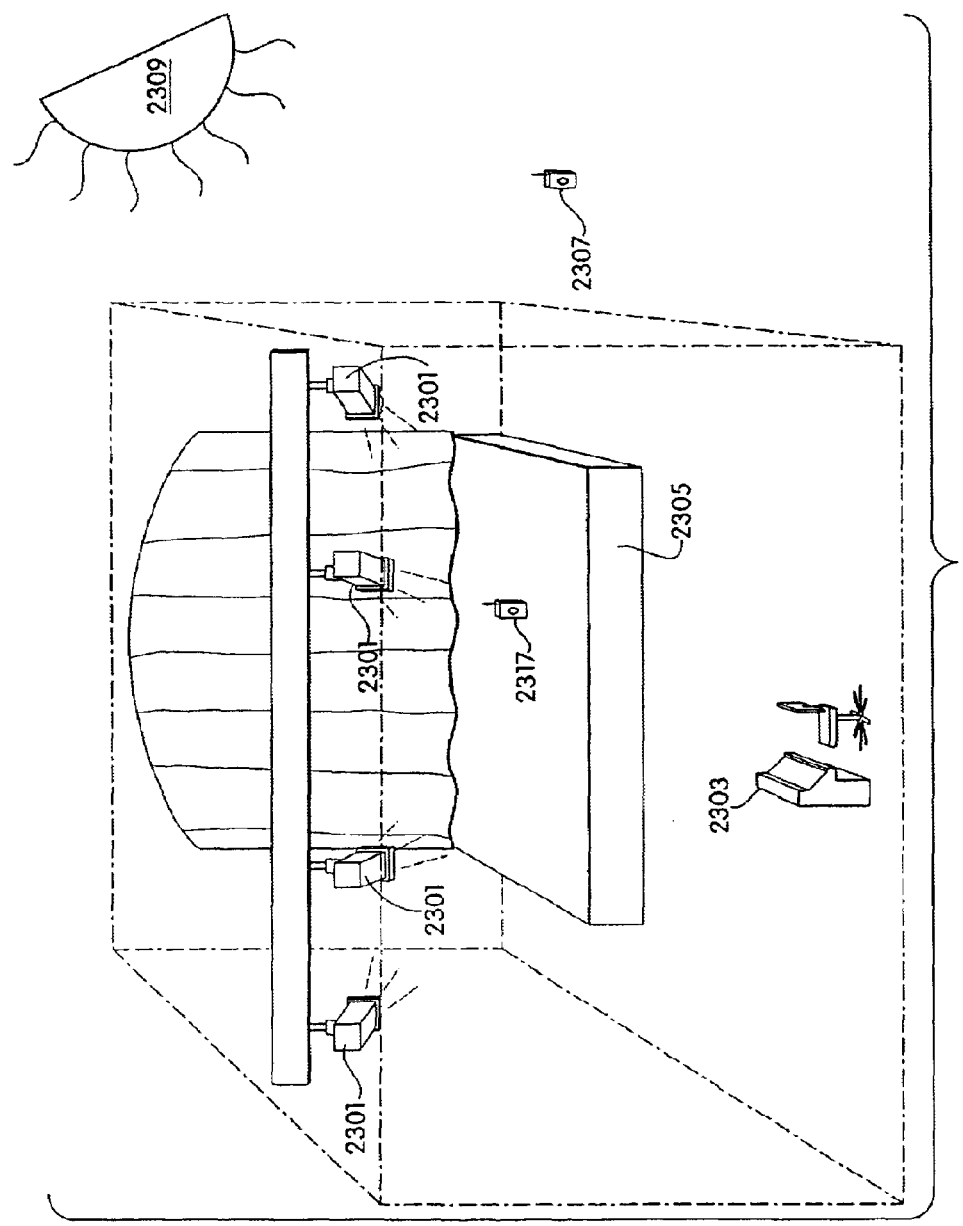
FIG. 11 shows an embodiment of a control system which enables multiple lighting control to simulate an environment.

Any of the above systems could be deployed in the system disclosed in FIG. 11. A lighting system for a location may comprise a plurality of lighting fixtures (2301) which are controllable by a central control system (2303). The light within the location (or on a particular location such as the stage (2305) depicted here) is now desired to mimic another type of light such as sunlight. A first sensor (2307) is taken outside and the natural sunlight (2309) is measured and recorded. This recording is then provided to central control system (2303). A second sensor (which may be the same sensor in one embodiment) (2317) is present on the stage (2305). The central control system (2303) now controls the intensity and color of the plurality of lighting fixtures (2301) and attempts to match the input spectrum of said second sensor (2317) with the prerecorded natural sunlight's (2309) spectrum. In this manner, interior lighting design can be dramatically simplified as desired colors of light can be reproduced or simulated in a closed setting. This call be in a theatre (as depicted here), or in any other location such as a home, and office, a soundstage, a retail store, or any other location where artificial lighting is used. Such a system could also be used in conjunction with other secondary light sources to create a desired lighting effect.

The above systems allow for the creation of lighting fixtures with virtually any type of spectrum. It is often desirable to produce light that appears "natural" or light which is a high-quality, especially white light.

A lighting fixture which produces white light according to the above invention can comprise any collection of component illumination sources such that the area defined by the illumination sources can encapsulate at least a portion of the black body curve. The black body curve (104) in FIG. 1 is a physical construct that shows different color white light with regards to the temperature of the white light. In a preferred embodiment, the entire black body curve would be encapsulated allowing the lighting fixture to produce any temperature of white light.

For a variable color white light with the highest possible intensity, a significant portion of the black body curve may be enclosed. The intensity at different color whites along the black body curve can then be simulated. The maximum intensity produced by this light could be placed along the black body curve. By varying the number of each color LED (in FIG. 6 red, blue, amber, and blue-green) it is possible to change the location of the full on point (the symbol (512) in FIG. 6). For example, the full on color could be placed at approximately 5400K (noon day sunlight shown by point (106) in FIG. 1), but any other point could be used (two other points are shown in FIG. 1 corresponding to a fire glow and an incandescent bulb). Such a lighting apparatus would then be able to produce 5400K light at a high intensity, in addition, the light may adjust for differences in temperature (for instance cloudy sunlight) by moving around in the defined area.

Although this system generates white light with a variable color temperature, it is not necessarily a high quality white light source. A number of combinations of colors of illumination sources can be chosen which enclose the black body curve, and the quality of the resulting lighting fixtures may vary depending on the illumination sources chosen.

Since white light is a mixture of different wavelengths of light, it is possible to characterize white light based on the component colors of light that are used to generate it. Red, green, and blue (RGB) can combine to form white; as can light blue, amber, and lavender; or cyan, magenta and yellow. Natural white light (sunlight) contains a virtually continuous spectrum of wavelengths across the human visible band (and beyond). This can be seen by examining sunlight through a prism, or looking at a rainbow. Many artificial white lights are technically white to the human eye, however, they can appear quite different when shown on colored surfaces because they lack a virtually continuous spectrum.

As an extreme example one could create a white light source using two lasers (or other narrow band optical sources) with complimentary wavelengths. These sources would have an extremely narrow spectral width perhaps 1 nm wide. To exemplify this, we will choose wavelengths of 635 nm and 493 nm. These are considered complimentary since they will additively combine to make light which the human eye perceives as white light. The intensity levels of these two lasers can be adjusted to some ratio of powers that will produce white light that appears to have a color temperature of 5000K. If this source were directed at a white surface, the reflected light will appear as 5000K white light.

The problem with this type of white light, is that it will appear extremely artificial when shown on a colored surface. A colored surface (as opposed to colored light) is produced because the surface absorbs and reflects different wavelengths of light. If hit by white light comprising a full spectrum (light with all wavelengths of the visible band at reasonable intensity), the surface will absorb and reflect perfectly. However, the white light above does not provide the complete spectrum. To again use an extreme example, if a surface only reflected light from 500 nm–550 nm it will appear a fairly deep green in full-spectrum light, but will appear black (it absorbs all the spectrums present) in the above described laser-generated artificial white light.

Figure 27:
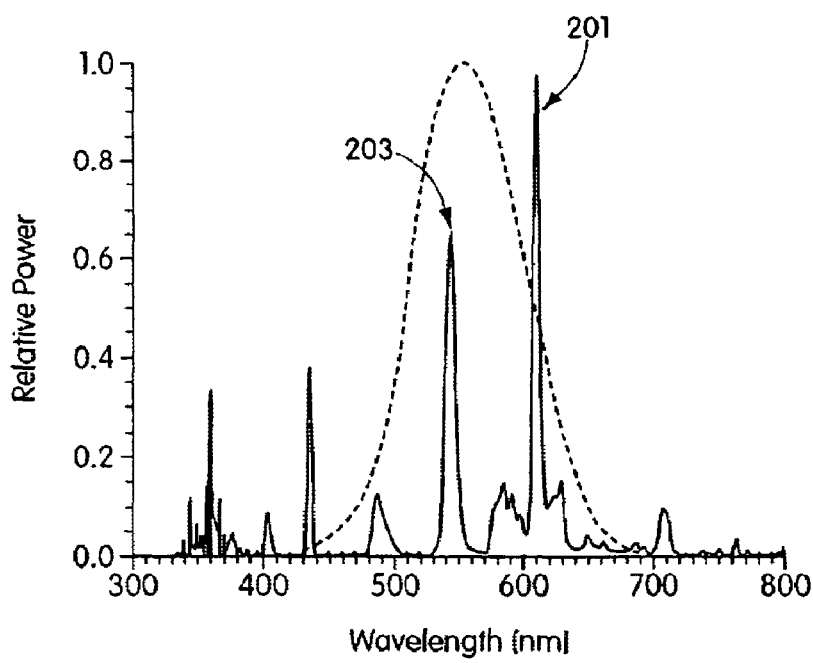
FIG. 27 is a diagram of the spectrum of a compact fluorescent light fixture with the spectral luminosity function as a dotted line.

Further, since the CRI index relies on a limited number of observations, there are mathematical loopholes in the method. Since the spectrums for CRI color samples are known, it is a relatively straightforward exercise to determine the optimal wavelengths and minimum numbers of narrow band sources needed to achieve a high CRI. This source will fool the CRI measurement, but not the human observer. The CRI method is at best an estimator of the spectrum that the human eye can see. An everyday example is the modern compact fluorescent lamp. It has a fairly high CRI of 80 and a color temperature of 2980K but still appears unnatural. The spectrum of a compact fluorescent is shown in FIG. 27.

Due to the desirability of high-quality light (in particular high-quality white light) that can be varied over different temperatures or spectrums, a further embodiment of this invention comprises systems and method for generating a higher-quality white light by mixing the electromagnetic radiation from a plurality of component illumination sources such as LEDs. This is accomplished by choosing LEDs that provide a white light that is targeted to the human eye's interpretation of light, as well as the mathematical CRI index. That light can then be maximized in intensity using the above system. Further, because the color temperature of the light can be controlled, this high quality white light can therefore still have the control discussed above and can be a controllable, high-quality, light which can produce high-quality light across a range of colors.

To produce a high-quality white light, it is necessary to examine the human eye's ability to see light of different wavelengths and determine what makes a light high-quality. In it's simplest definition, a high-quality white light provides low distortion to colored objects when they are viewed under it. It therefore makes sense to begin by examining a high-quality light based on what the human eye sees. Generally the highest quality white light is considered to be sunlight or full-spectrum light, as this is the only source of "natural" light. For the purposes of this disclosure, it will be accepted that sunlight is a high-quality white light.

Figure 12:
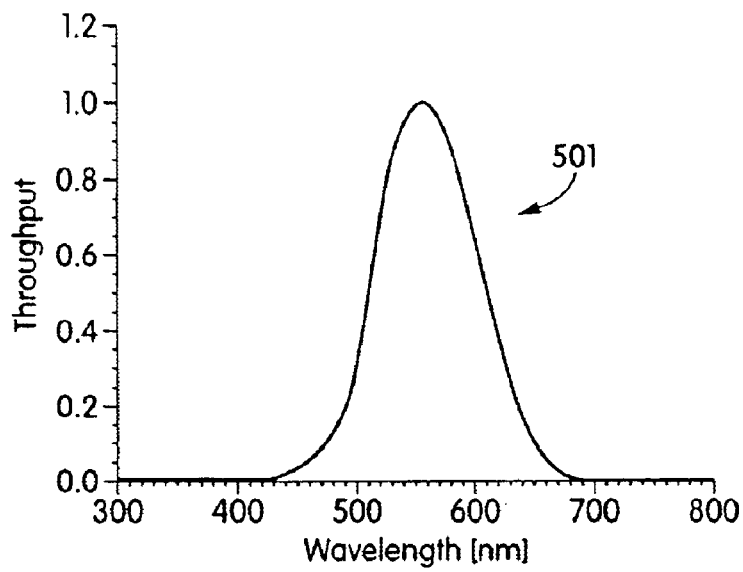
FIG. 12 depicts the CIE spectral luminosity function Vλ which indicates the receptivity of the human eye.

The sensitivity of the human eye is known as the Photopic response. The Photopic response can be thought of as a spectral transfer function for the eye, meaning that it indicates how much of each wavelength of light input is seen by the human observer. This sensitivity can be expressed graphically as the spectral luminosity function Vλ (501), which is represented in FIG. 12.

The eye's Photopic response is important since it can be used to describe the boundaries on the problem of generating white light (or of any color of light). In one embodiment of the invention, a high quality white light will need to comprise only what the human eye can "see." In another embodiment of the invention, it can be recognized that high-quality white light may contain electromagnetic radiation which cannot be seen by the human eye but may result in a photobiological response. Therefore a high-quality white light may include only visible light, or may include visible light and other electromagnetic radiation which may result in a photobiological response. This will generally be electromagnetic radiation less than 400 nm (ultraviolet light) or greater than 700 nm (infrared light).

Using the first part of the description, the source is not required to have any power above 700 nm or below 400 µm since the eye has only minimal response at these wavelengths. A high-quality source would preferably be substantially continuous between these wavelengths (otherwise colors could be distorted) but can fall-off towards higher or lower wavelengths due to the sensitivity of the eye. Further, the spectral distribution of different temperatures of white light will be different. To illustrate this, spectral distributions for two blackbody sources with temperatures of 5000K (601) and 2500K (603) are shown in FIG. 13 along with the spectral luminosity function (501) from FIG. 12.

Figure 13:
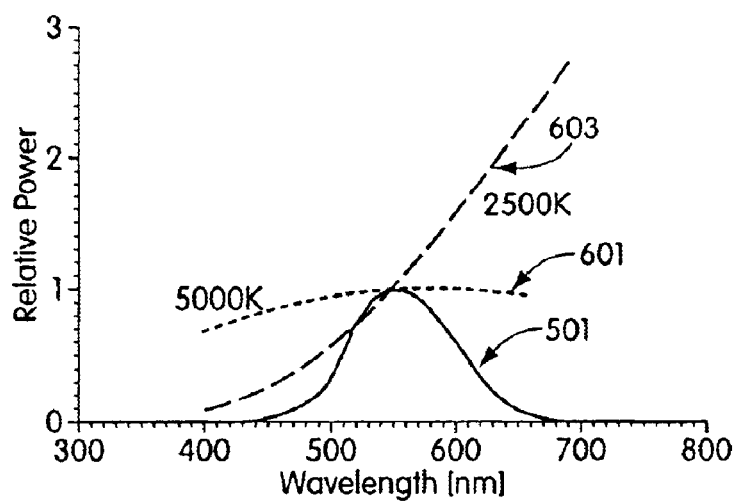
FIG. 13 depicts spectral distributions of black body sources at 5,000 K and 2,500 K.

As seen in FIG. 13, the 5000K curve is smooth and centered about 555 nm with only a slight fall-off in both the increasing and decreasing wavelength directions. The 2500K curve is heavily weighted towards higher wavelengths. This distribution makes sense intuitively, since lower color temperatures appear to be yellow-to-reddish. One point that arises from the observation of these curves, against the spectral luminosity curve, is that the Photopic response of the eye is "filled." This means that every color that is illuminated by one of these sources will be perceived by a human observer. Any holes, i.e., areas with no spectral power, will make certain objects appear abnormal. This is why many "white" light sources seem to disrupt colors. Since the blackbody curves are continuous, even the dramatic change from 5000K to 2500K will only shift colors towards red, making them appear warmer but not devoid of color. This comparison shows that an important specification of any high-quality artificial light fixture is a continuous spectrum across the photopic response of the human observer.

Having examined these relationships of the human eye, a fixture for producing controllable high-quality white light would need to have the following characteristic. The light has a substantially continuous spectrum over the wavelengths visible to the human eye, with any holes or gaps located in the areas where the human eye is less responsive. In addition, in order to make a high-quality white light controllable over a range of temperatures, it would be desirable to produce a light spectrum which can have relatively equal values of each wavelength of light, but can also make different wavelengths dramatically more or less intense with regards to other wavelengths depending on the color temperature desired. The clearest waveform which would have such control would need to mirror the scope of the photopic response of the eye, while still being controllable at the various different wavelengths.

As was discussed above, the traditional mixing methods which create white light can create light which is technically "white" but still produces an abnormal appearance to the human eye. The CRI rating for these values is usually extremely low or possibly negative. This is because if there is not a wavelength of light present in the generation of white light, it is impossible for an object of a color to reflect/absorb that wavelength. In an additional case, since the CRI rating relies on eight particular color samples, it is possible to get a high CRI, while not having a particularly high-quality light because the white light functions well for those particular color samples specified by the CRI rating. That is, a high CRI index could be obtained by a white light composed of eight 1 nm sources which were perfectly lined up with the eight CRI color structures. This would, however, not be a high-quality light source for illuminating other colors.

The fluorescent lamp shown in FIG. 27 provides a good example of a high CRI light that is not high-quality. Although the light from a fluorescent lamp is white, it is comprised of many spikes (such as (201) and (203)). The position of these spikes has been carefully designed so that when measured using the CRI samples they yield a high rating. In other words, these spikes fool the CRI calculation but not the human observer. The result is a white light that is usable but not optimal (i.e., it appears artificial). The dramatic peaks in the spectrum of a fluorescent light are also clear in FIG. 27. These peaks are part of the reason that fluorescent light looks very artificial. Even if light is produced within the spectral valleys, it is so dominated by the peaks that a human eye has difficulty seeing it. A high-quality white light may be produced according to this disclosure without the dramatic peaks and valleys of a florescent lamp.

A spectral peak is the point of intensity of a particular color of light which has less intensity at points immediately to either side of it. A maximum spectral peak is the highest spectral peak within the region of interest. It is therefore possible to have multiple peaks within a chosen portion of the electromagnetic spectrum, only a single maximum peak, or to have no peaks at all. For instance, FIG. 12 in the region 500 $\mu$m to 510 $\mu$m has no spectral peaks because there is no point in that region that has lower points on both sides of it.

A valley is the opposite of a peak and is a point that is a minimum and has points of higher intensity on either side of it (an inverted plateau is also a valley). A special plateau can also be a spectrum peak, a plateau involves a series of concurrent points of the same intensity with the points on either side of the series having less intensity.

It should be clear that high-quality white light simulating black-body sources do not have significant peaks and valleys within the area of the human eye's photopic response as is shown in FIG. 13.

Most artificial light, does however have some peaks and valleys in this region such shown in FIG. 27, however the less difference between these points the better. This is especially true for higher temperature light whereas for lower temperature light the continuous line has a positive upward slope with no peaks or valleys and shallow valleys in the shorter wavelength areas would be less noticeable, as would slight peaks in the longer wavelengths.

To take into account this peak and valley relationship to high-quality white light, the following is desirable in a high-quality white light of one embodiment of this invention. The lowest valley in the visible range should have a greater intensity than the intensity attributable to background noise as would be understood by one of skill in the art. It is further desirable to close the gap between the lowest valley and the maximum peak, and other embodiments of the invention have lowest valleys with at least 5%, 10%, 25%, 33%, 50%, and 75% of the intensity of the maximum peaks. One skilled in the art would see that other percentages could be used anywhere up to 100%.

In another embodiment, it is desirable to mimic the shape of the black body spectra at different temperatures, for higher temperatures (4,000 k to 10,000 k) this may be similar to the peaks and valleys analysis above. For lower temperatures, another analysis would be that most valleys should be at a shorter wavelength than the highest peak. This would be desirable in one embodiment for color temperatures less than 2500 k. In another embodiment it would be desirable to have this in the region 500 k to 2500 k.

From the above analysis high-quality artificial white light should therefore have a spectrum that is substantially continuous between the 400 nm and 700 nm without dramatic spikes. Further, to be controllable, the light should be able to produce a spectrum that resembles natural light at various color temperatures. Due to the use of mathematical models in the industry, it is also desirable for the source to yield a high CRI indicative that the reference colors are being preserved and showing that the high-quality white light of the instant invention does not fail on previously known tests.

In order to build a high-quality white light lighting fixture using LEDs as the component illumination sources, it is desirable in one embodiment to have LEDs with particular maximum spectral peaks and spectral widths. It is also desirable to have the lighting fixture allow for controllability, that is that the color temperature can be controlled to select a particular spectrum of "white" light or even to have a spectrum of colored light in addition to the white light. It would also be desirable for each of the LEDs to produce equal intensities of light to allow for easy mixing.

One system for creating white light includes a large number (for example around 300) of LEDs, each of which has a narrow spectral width and each of which has a maximum spectral peak spanning a predetermined portion of the range from about 400 nm to about 700 nm, possibly with some overlap, and possibly beyond the boundaries of visible light. This light source may produce essentially white light, and may be controllable to produce any color temperature (and also any color). It allows for smaller variation than the human eye can see and therefore the light fixture can make changes more finely than a human can perceive. Such a light is therefore one embodiment of the invention, but other embodiments can use fewer LEDs when perception by humans is the focus.

Figure 14:
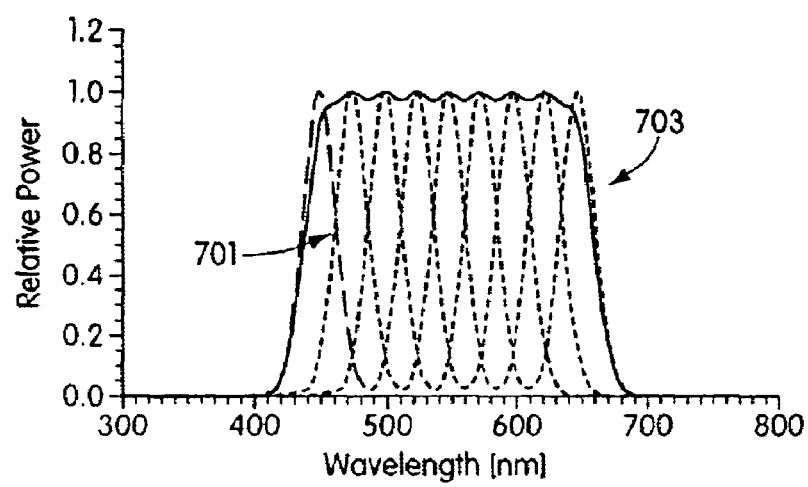
FIG. 14 depicts one embodiment of a nine LED white light source.
Figure 15A:
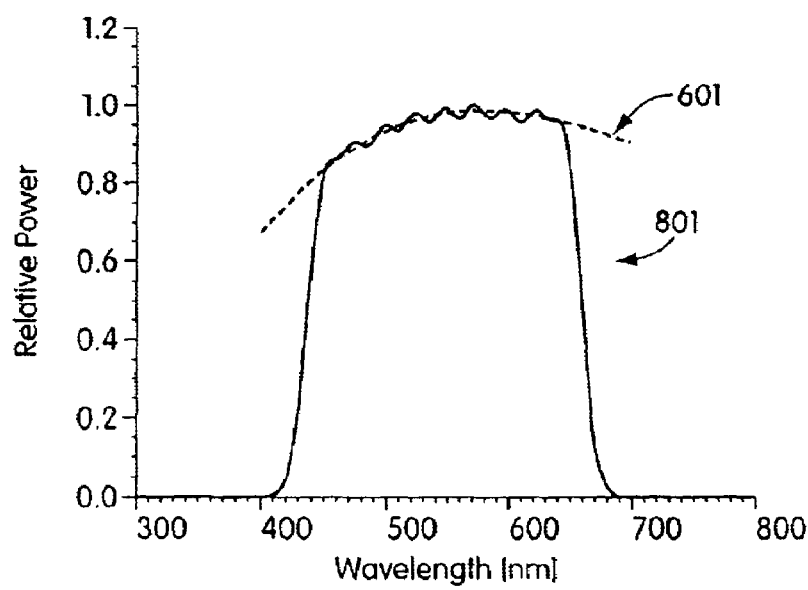
FIG. 15a depicts the output of one embodiment of a lighting fixture comprising nine LEDs and producing 5,000 K white light.
Figure 15B:
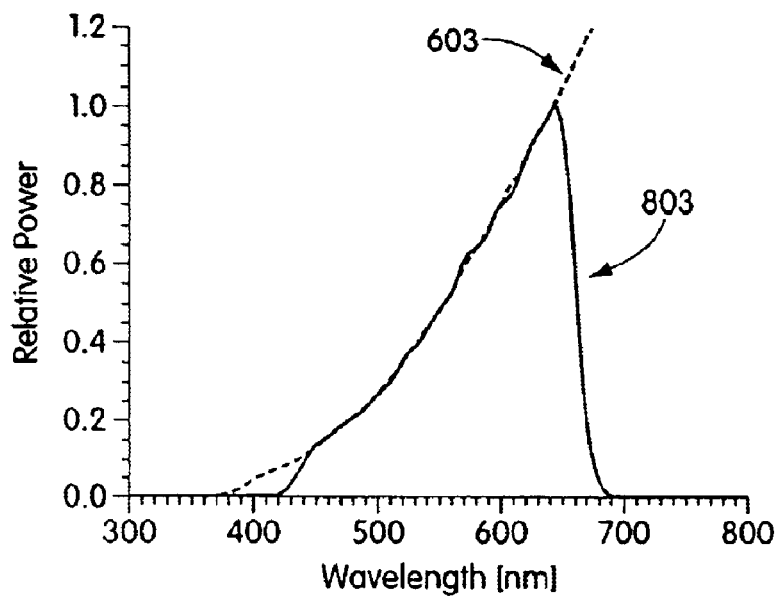
FIG. 15b depicts the output of one embodiment of a lighting fixture comprising nine LEDs and producing 2,500 K white light.

In another embodiment of the invention, a significantly smaller number of LEDs can be used with the spectral width of each LED increased to generate a high-quality white light. One embodiment of such a light fixture is shown in FIG. 14. FIG. 14 shows the spectrums of nine LEDs (701) with 25 nm spectral widths spaced every 25 μm. It should be recognized here that a nine LED lighting fixture does not necessarily contain exactly nine total illumination sources. It contains some number of each of nine different colored illuminating sources. This number will usually be the same for each color, but need not be. High-brightness LEDs with a spectral width of about 25 nm are generally available. The solid line (703) indicates the additive spectrum of all of the LED spectrums at equal power as could be created using the above method lighting fixture. The powers of the LEDs may be adjusted to generate a range of color temperature (and colors as well) by adjusting the relative intensities of the nine LEDs. FIGS. 15a and 15b are spectrums for the 5000K (801) and 2500K (803) white-light from this lighting fixture. This nine LED lighting fixture has the ability to reproduce a wide range of color temperatures as well as a wide range of colors as the area of the CIE diagram enclosed by the component LEDs covers most of the available colors. It enables control over the production of non-continuous spectrums and the generation of particular high-quality colors by choosing to use only a subset of the available LED illumination sources. It should be noted that the choice of location of the dominant wavelength of the nine LEDs could be moved without significant variation in the ability to produce white light. In addition, different colored LEDs may be added. Such additions may improve the resolution as was discussed in the 300 LED example above. Any of these light fixtures may meet the quality standards above. They may produce a spectrum that is continuous over the photopic response of the eye, that is without dramatic peaks, and that can be controlled to produce a white light of multiple desired color temperatures.

The nine LED white light source is effective since its spectral resolution is sufficient to accurately simulate spectral distributions within human-perceptible limits. However, fewer LEDs may be used. If the specifications of making high-quality white light are followed, the fewer LEDs may have an increased spectral width to maintain the substantially continuous spectrum that fills the Photopic response of the eye. The decrease could be from any number of LEDs from 8 to 2. The 1 LED case allows for no color mixing and therefore no control. To have a temperature controllable white light fixture at least two colors of LEDs may be required.

Figure 16:
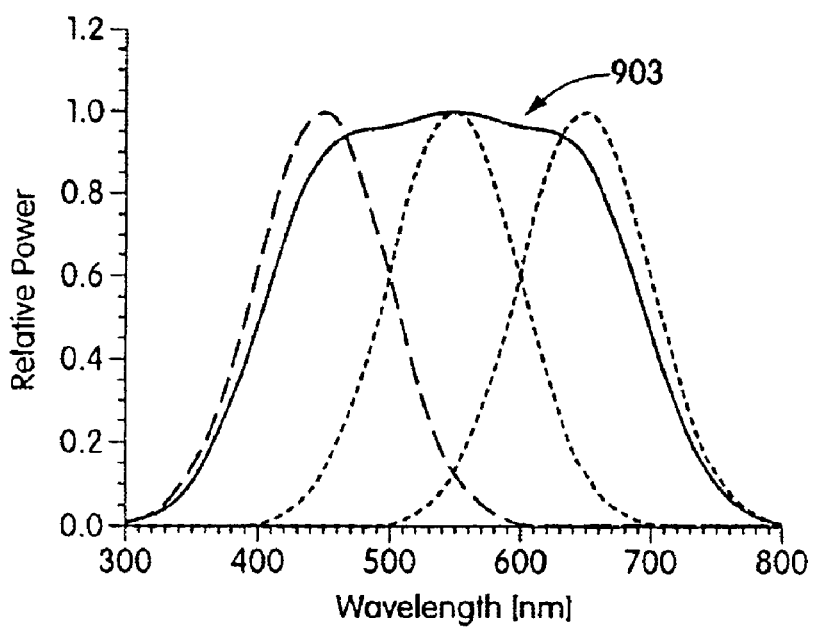
FIG. 16 depicts one embodiment of the component spectrums of a three LED light fixture.

One embodiment of the current invention includes three different colored LEDs. Three LEDs allow for a two dimensional area (a triangle) to be available as the spectrum for the resultant fixture. One embodiment of a three LED source is shown in FIG. 16.

Figure 17A:
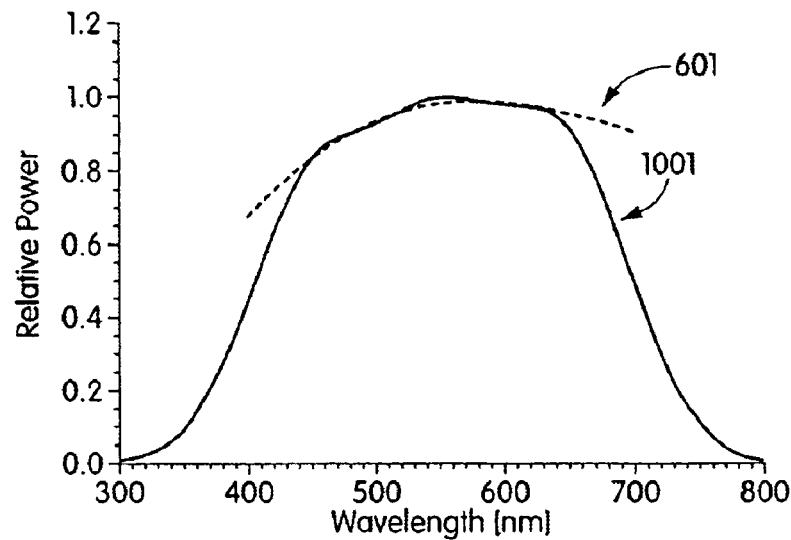
FIG. 17a depicts the output of one embodiment of a lighting fixture comprising three LEDs and producing 5,000 K white light.
Figure 17B:
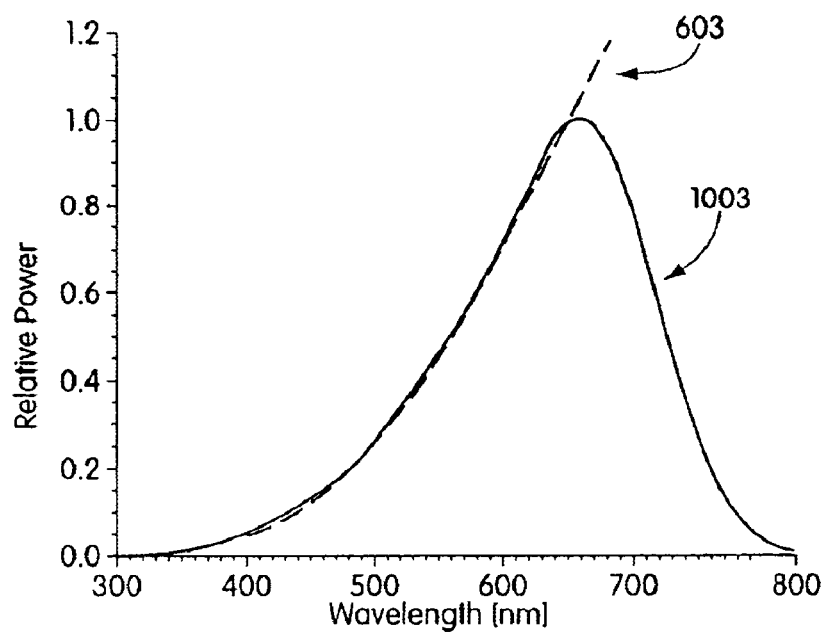
FIG. 17b depicts the output of one embodiment of a lighting fixture comprising three LEDs and producing 2,500 K white light.

The additive spectrum of the three LEDs (903) offers less control than the nine LED lighting fixture, but may meet the criteria for a high-quality white light source as discussed above. The spectrum may be continuous without dramatic peaks. It is also controllable, since the triangle of available white light encloses the black body curve. This source may lose fine control over certain colors or temperatures that were obtained with a greater number of LEDs as the area enclosed on the CIE diagram is a triangle, but the power of these LEDs can still be controlled to simulate sources of different color temperatures. Such an alteration is shown in FIGS. 17a and 17b for 5000K (1001) and 2500K (1003) sources. One skilled in the art, would see that alternative temperatures may also be generated.

Both the nine LED and three LED examples demonstrate that combinations of LEDs can be used to create high-quality white lighting fixtures. These spectrums fill the photopic response of the eye and are continuous, which means they appear more natural than artificial light sources such as fluorescent lights. Both spectra may be characterized as high-quality since the CRIs measure in the high 90s.

In the design of a white lighting fixture, one impediment is the lack of current availability for LEDs with a maximum spectral peak of 555 nm. This wavelength is at the center of the Photopic response of the eye and one of the clearest colors to the eye. The introduction of an LED with a dominant wavelength at or near 555 nm would simplify the generation of LED-based white light, and a white light fixture with such an LED comprises one embodiment of this invention. In another embodiment of the invention, a non-LED illumination source that produces light with a maximum spectral peak from about 510 nm to about 570 nm could also be used to fill this particular spectral gap. In a still further embodiment, this non-LED source could comprise an existing white light source and a filter to make that resulting light source have a maximum spectral peak in this general area.

In another embodiment high-quality white light may be generated using LEDs without spectral peaks around 555 nm to fill in the gap in the Photopic response left by the absence of green LEDs. One possibility is to fill the gap with a non-LED illumination source. Another, as described below, is that a high-quality controllable white light source can be generated using a collection of one or more different colored LEDs where none of the LEDs have a maximum spectral peak in the range of about 510 nm to 570 nm.

To build a white light lighting fixture that is controllable over a generally desired range of color temperatures, it is first necessary to determine the criteria of temperatures desired.

In one embodiment, this is chosen to be color temperatures from about 2300K to about 4500K which is commonly used by lighting designers in industry. However, any range could be chosen for other embodiments including the range from 500K to 10,000K which covers most variation in visible white light or any sub-range thereof. The overall output spectrum of this light may achieve a CRI comparable to standard light sources already existing. Specifically, a high CRI (greater than 80) at 4500K and lower CRI (greater than 50) at 2300K may be specified although again any value could be chosen. Peaks and valleys may also be minimized in the range as much as possible and particularly to have a continuous curve where no intensity is 0.

In recent years, white LEDs have become available. These LEDs operate using a blue LED to pump a layer of phosphor. The phosphor down-converts some of the blue light into green and red. The result is a spectrum that has a wide spectrum and is roughly centered about 555 nm, and is referred to as "cool white." An example spectrum for such a white LED (in particular for a Nichia NSPW510 BS (bin A) LED), is shown in FIG. 18 as the spectrum (1201).

Figure 18:
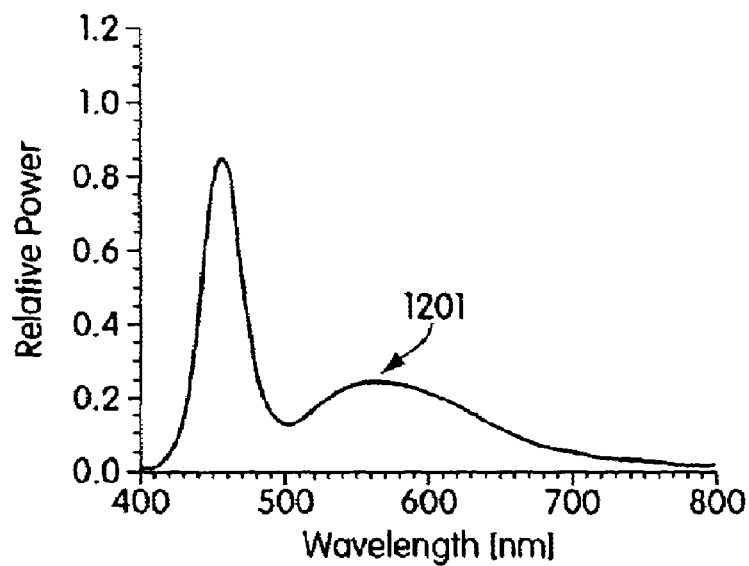
FIG. 18 depicts the spectrum of a white Nichia LED, NSP510 BS (bin A).

The spectrum (1201) shown in FIG. 18 is different from the Gaussian-like spectrums for some LEDs. This is because not all of the pump energy from the blue LED is down-converted. This has the effect of cooling the overall spectrum since the higher portion of the spectrum is considered to be warm. The resulting CRI for this LED is 84 but it has a color temperature of 20,000K. Therefore the LED on its own does not meet the above lighting criteria. This spectrum (1201) contains a maximum spectral peak at about 450 nm and does not accurately fill the photopic response of the human eye. A single LED also allows for no control of color temperature and therefore a system of the desired range of color temperatures cannot be generated with this LED alone.

Figure 19:
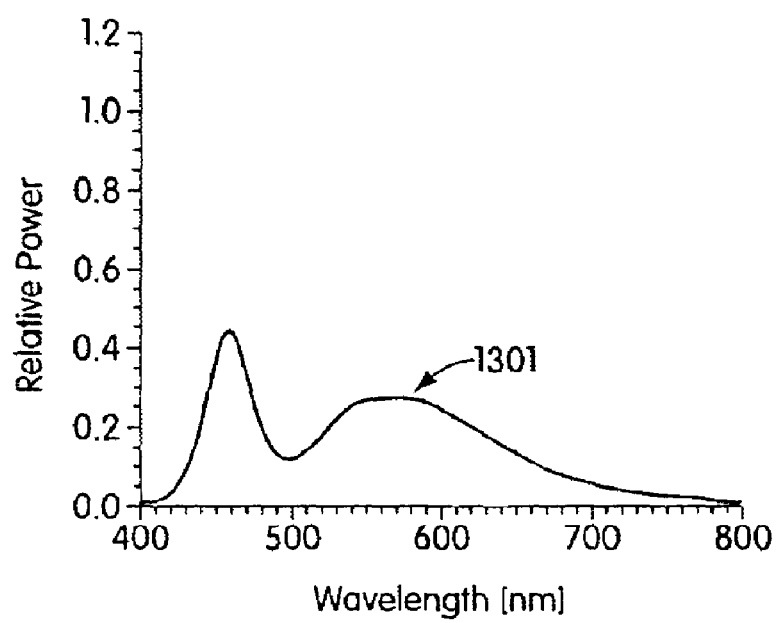
FIG. 19 depicts the spectrum of a white Nichia LED, NSP510 BS (bin C).

Nichia Chemical currently has three bins (A, B, and C) of white LEDs available. The LED spectrum (1201) shown in FIG. 18 is the coolest of these bins. The warmest LED is bin C (the spectrum (1301) of which is presented in FIG. 19). The CRI of this LED is also 84; it has a maximum spectral peak of around 450 nm, and it has a CCT of 5750K. Using a combination of the bin A or C LEDs will enable the source to fill the spectrum around the center of the Photopic response, 555 nm. However, the lowest achievable color temperature will be 5750K (from using the bin C LED alone) which does not cover the entire range of color temperatures previously discussed. This combination will appear abnormally warm (blue) on its own as the additive spectrum will still have a significant peak around 450 nm.

Figure 20:
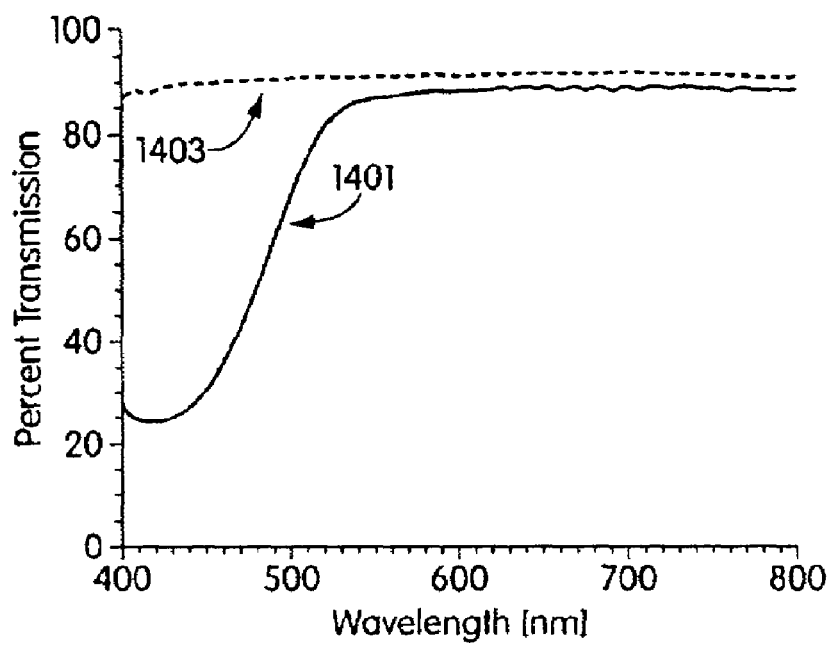
FIG. 20 depicts the spectral transmission of one embodiment of a high pass filter.

The color temperature of these LEDs can be shifted using an optical high-pass filter placed over the LEDs. This is essentially a transparent piece of glass or plastic tinted so as to enable only higher wavelength light to pass through. One example of such a high-pass filter's transmission is shown in FIG. 20 as line (1401). Optical filters are known to the art and the high pass filter will generally comprise a translucent material, such as plastics, glass, or other transmission media which has been tinted to form a high pass filter such as the one shown in FIG. 20. One embodiment of the invention includes generating a filter of a desired material (to obtain particular physical properties) upon specifying the desired optical properties. This filter may be placed over the LEDs directly, or may be filter (391) from the lighting fixture's housing.

Figure 30:
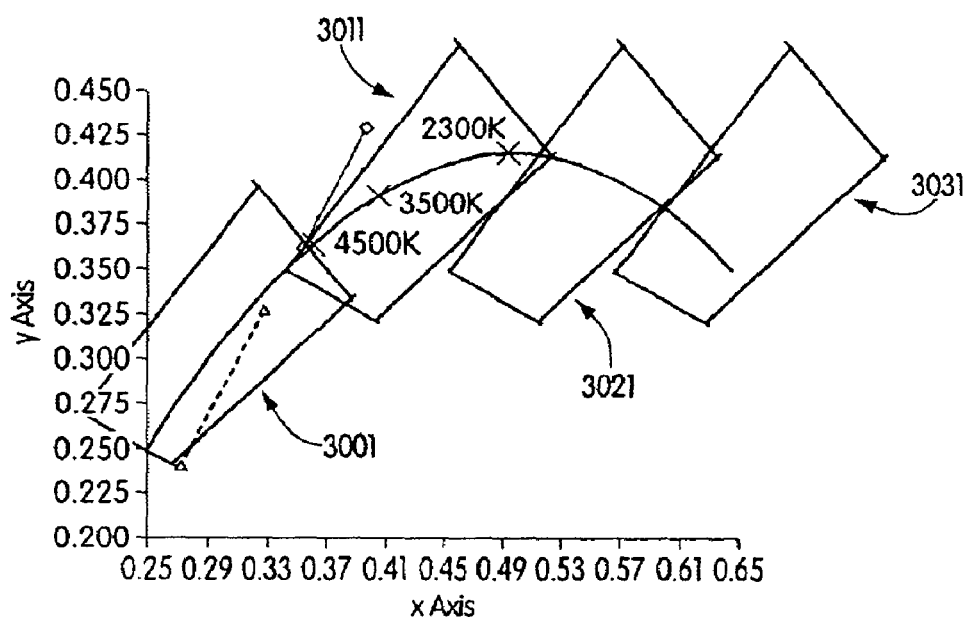
FIG. 30 depicts one embodiment of how a series of filters could be used to enclose different portions of the black body locus.

One embodiment of the invention allows for the existing fixture to have a preselection of component LEDs and a selection of different filters. These filters may shift the range of resultant colors without alteration of the LEDs. In this way a filter system may be used in conjunction with the selected LEDs to fill an area of the CIE enclosed (area (510)) by a light fixture that is shifted with respect to the LEDs, thus permitting an additional degree of control. In one embodiment, this series of filters could enable a single light fixture to produce white light of any temperature by specifying a series of ranges for various filters which, when combined, enclose the white line. One embodiment of this is shown in FIG. 30 where a selection of areas (3001, 3011, 3021, 3031) depends on the choice of filters shifting the enclosed area.

This spectral transmission measurement shows that the high pass filter in FIG. 20 absorbs spectral power below 500 nm. It also shows an overall loss of approximately 10% which is expected. The dotted line (1403) in FIG. 20 shows the transmission loss associated with a standard polycarbonate diffuser which is often used in light fixtures. It is to be expected that the light passing through any substance will result in some decrease in intensity.

Figure 21A:
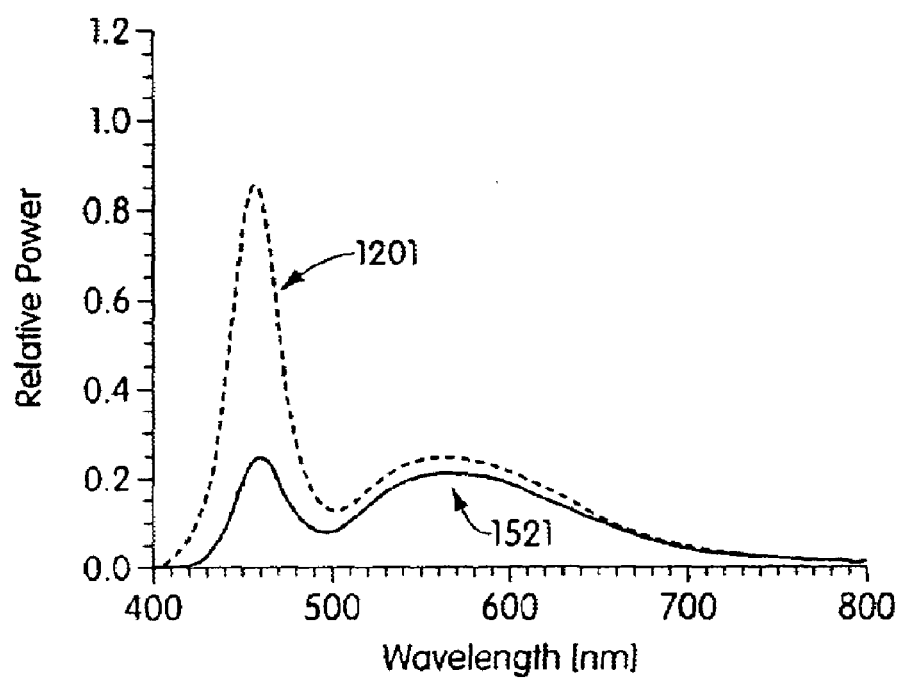
FIG. 21a depicts the spectrum of FIG. 18 and the shifted spectrum from passing the spectrum of FIG. 18 through the high pass filter in FIG. 20.
Figure 21B:
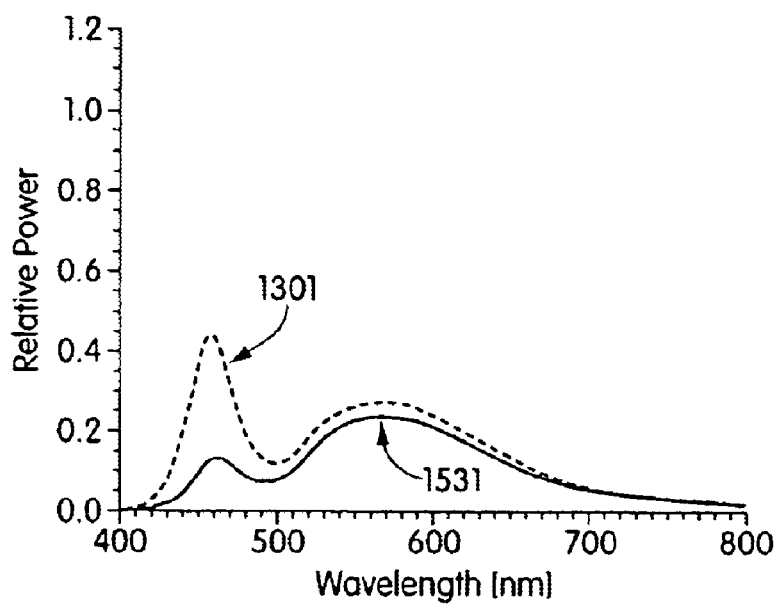
FIG. 21b depicts the spectrum of FIG. 19 and the shifted spectrum from passing the spectrum of FIG. 19 through the high pass filter in FIG. 20.

The filter whose transmission is shown in FIG. 20 can be used to shift the color temperature of the two Nichia LEDs. The filtered ((1521) and (1531)) and un-filtered ((1201) and (1301)) spectrums for the bin A and C LEDs are shown in FIGS. 21*a* and 21*b*.

The addition of the yellow filter shifts the color temperature of the bin A LED from 20,000K to 4745K. Its chromaticity coordinates are shifted from (0.27,0.2A) to (0.35, 0.37). The bin C LED is shifted from 5750K to 3935K and from chromaticity coordinates (0.33,0.33) to (0.40, 0.43).

Figure 22:
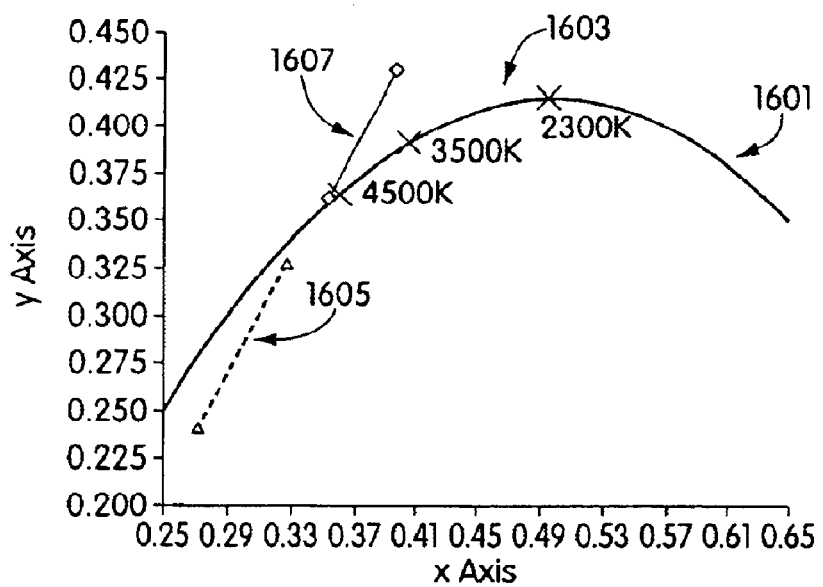
FIG. 22 is a chromaticity map showing the black body locus (white line) enlarged on a portion of temperature between 2,300 K and 4,500 K. Also shown is the light produced by two LEDs in one embodiment of the invention.

The importance of the chromaticity coordinates becomes evident when the colors of these sources are compared on the CIE 1931. Chromaticity Map. FIG. 22 is a close-up of the chromaticity Map around the Plankian locus (1601). This locus indicates the perceived colors of ideal sources called blackbodies. The thicker line (1603) highlights the section of the locus that corresponds to the range from 2300K to 4500K.

FIG. 22 illustrates how large of a shift can be achieved with a simple high-pass filter. By effectively "warming up" the set of Nichia LEDs, they are brought into a chromaticity range that is useful for the specified color temperature control range and are suitable for one embodiment of the invention. The original placement was dashed line (1665), while the new color is represented by line (1607) which is within the correct region.

In one embodiment, however, a non-linear range of color temperatures may be generated using more than two LEDs.

The argument could be made that even a linear variation closely approximating the desired range would suffice. This realization would call for an LED close to 2300K and an LED close to 4500K, however. This could be achieved two ways. One, a different LED could be used that has a color temperature of 2300K. Two, the output of the Nichia bin C LED could be passed through an additional filter to shift it even closer to the 2300K point. Each of these Systems comprises an additional embodiment of the instant invention. However, the following example uses a third LED to meet the desired criteria.

Figure 23:
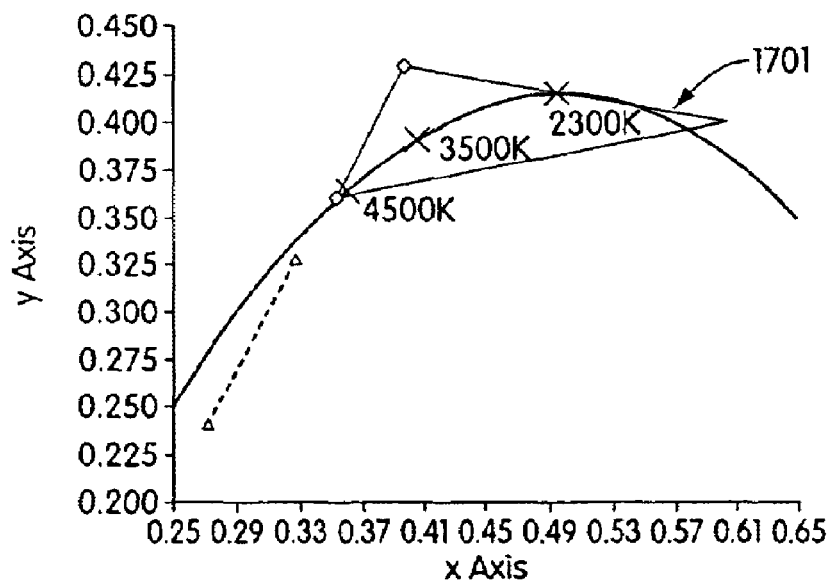
FIG. 23 is the chromaticity map further showing the gamut of light produced by three LEDs in one embodiment of the invention.

This LED should have a chromaticity to the right of the 2300K point on the blackbody locus. The Agilent HLMP-EL18 amber LED, with a dominant wavelength of 592 nm, has chromaticity coordinates (0.60,0.40). The addition of the Agilent amber to the set of Nichia white LEDs results in the range (1701) shown in FIG. 23.

Figure 26A:
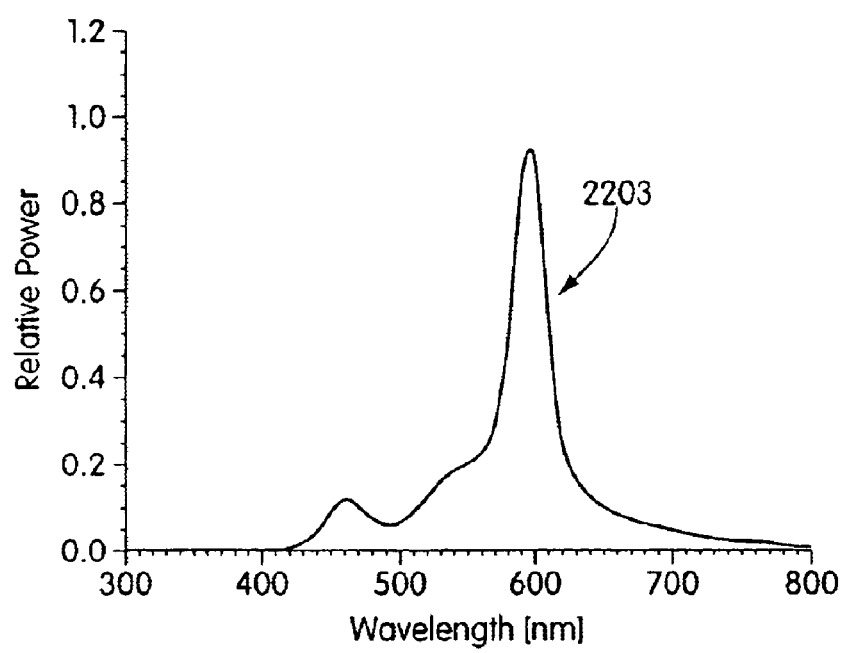
FIG. 26a depicts the spectrum of one embodiment of a white light fixture according to the invention producing light at 2300K.
Figure 26B:
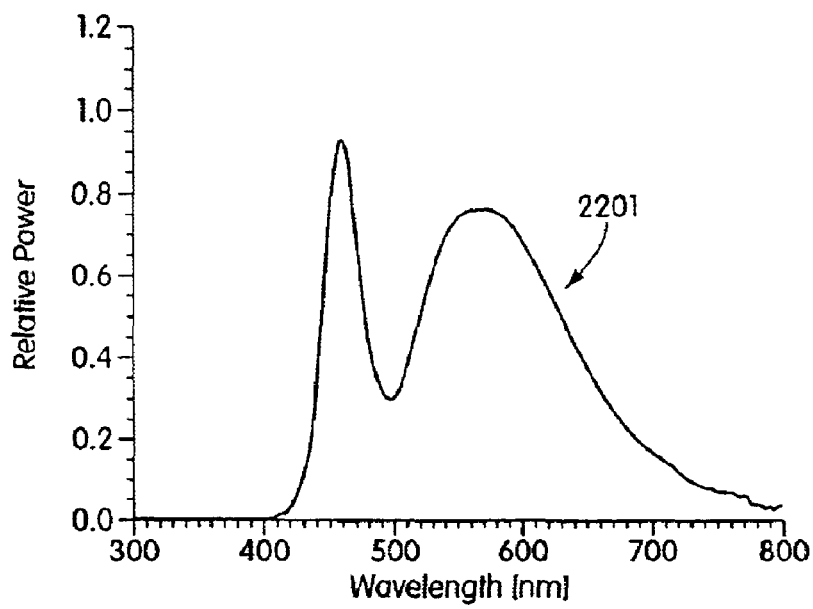
FIG. 26b depicts the spectrum of one embodiment of a white light fixture producing light at 4500K.

The range (1701) produced using these three LEDs completely encompasses the blackbody locus over the range from 2300K to 4500K. A light fixture fabricated using these LEDs may meet the requirement of producing white light with the correct chromaticity values. The spectra of the light at 2300K (2203) and 5000K (2201) in FIGS. 26*a* and *b* show spectra which meet the desired criteria for high-quality white light, both spectra are continuous and the 5000K spectrum does not show the peaks present in other lighting fixtures, with reasonable intensity at all wavelengths. The 2300K spectrum does not have any valleys at lower wavelengths than it's maximum peak. The light is also controllable over these spectra. However, to be considered high-quality white light by the lighting community, the CRI should be above 50 for low color temperatures and above 80 for high color temperatures. According to the software program that accompanies the CIE 13.3-1995 specification, the CRI for the 2300K simulated spectrum is 52 and is similar to an incandescent bulb with a CRI of 50. The CRI for the 4500K simulated spectrum is 82 and is considered to be high-quality white light. These spectra are also similar in shape to the spectra of natural light as shown in FIGS. 26a and 26b.

Figure 24:
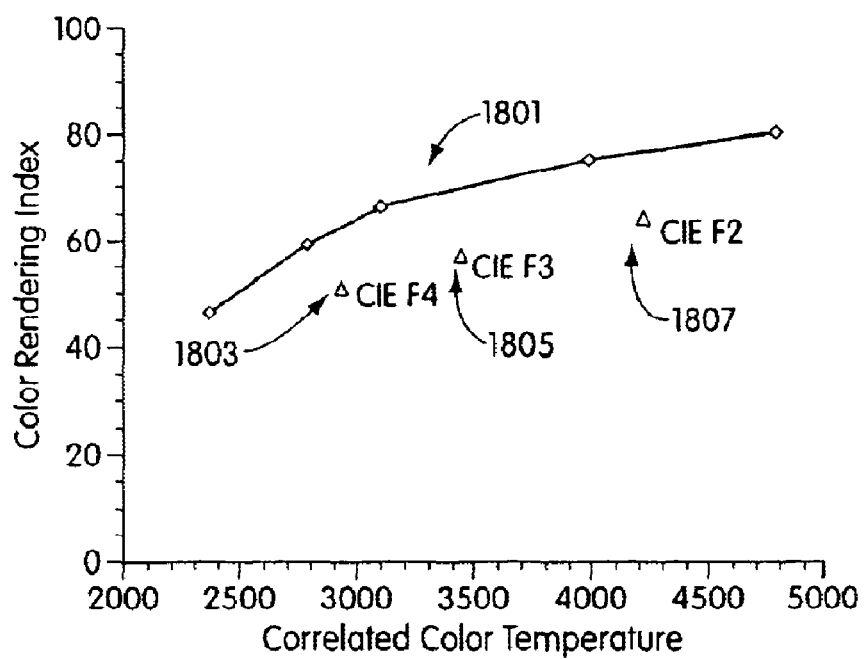
FIG. 24 shows a graphical comparison of the CRI of a lighting fixture of the invention compared to existing white light sources.
Figure 25:
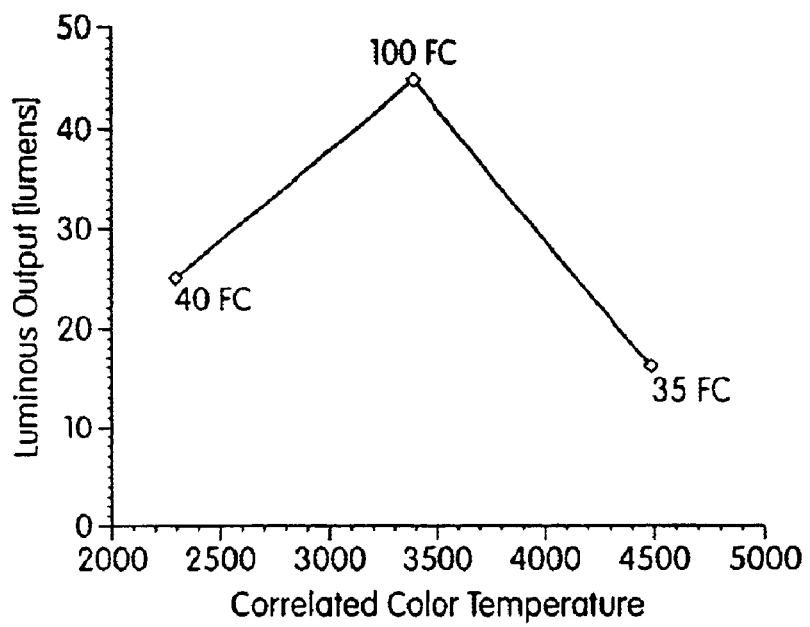
FIG. 25 shows the luminous output of a lighting fixture of the invention at various color temperatures.

FIG. 24 shows the CRI plotted with respect to the CCT for the above white light source. This comparison shows that the high-quality white light fixture above will produce white light that is of higher quality than the three standard fluorescent lights (1803), (1805), and (1809) used in FIG. 24. Further, the light source above is significantly more controllable than a fluorescent light as the color temperature can be selected as any of those points on curve (1801) while the fluorescents are limited to the particular points shown. The luminous output of the described white light lighting fixture was also measured. The luminous output plotted with respect to the color temperature is given in FIG. 25, although the graph in FIG. 25 is reliant on the types and levels of power used in producing it, the ratio may remain constant with the relative number of the different outer LEDs selected. The full-on point (point of maximum intensity) may be moved by altering the color of each of the LEDs present.

It would be understood by one of skill in the art that the above embodiments of white-light fixtures and methods could also include LEDs or other component illumination sources which produce light not visible to the human eye. Therefore any of the above embodiments could also include illumination sources with a maximum spectral peak below 400 nm or above 700 nm.

Figure 28:
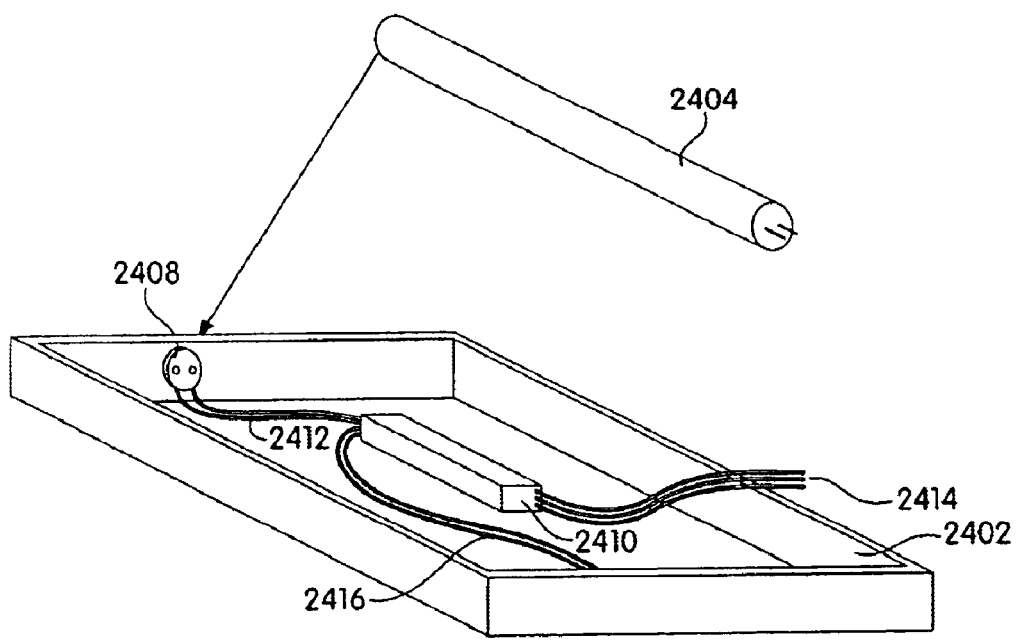
FIG. 28 shows a lamp for using fluorescent tubes as in known in the art.

A high-quality LED-based light may be configured to replace a fluorescent tube. In one embodiment, a replacement high-quality LED light source useful for replacing fluorescent tubes would function in an existing device designed to use fluorescent tubes. Such a device is shown in FIG. 28. FIG. 28 shows a typical fluorescent lighting fixture or other device configured to accept fluorescent tubes (2404). The lighting fixture (2402) may include a ballast (2410). The ballast (2410) maybe a magnetic type or electronic type ballast for supplying the power to at least one tube (2404) which has traditionally been a fluorescent tube. The ballast (2410) includes power input connections (2414) to be connected with an external power supply. The external power supply may be a building's AC supply or any other power supply known in the art. The ballast (2410) has tube connections (2412) and (2416) which attach to a tube coupler (2408) for easy insertion and removal of tubes (2404). These connections deliver the requisite power to the tube. In a magnetic ballasted system, the ballast (2410) may be a transformer with a predetermined impedance to supply the requisite voltage and current. The fluorescent tube (2404) acts like a short circuit so the ballast's impedance is used to set the tube current. This means that each tube wattage requires a particular ballast. For example, a forty-watt fluorescent tube will only operate on a forty-watt ballast because the ballast is matched to the tube. Other fluorescent lighting fixtures use electronic ballasts with a high frequency sine wave output to the bulb. Even in these systems, the internal ballast impedance of the electronic ballast still regulates the current through the tube.

Figure 29:
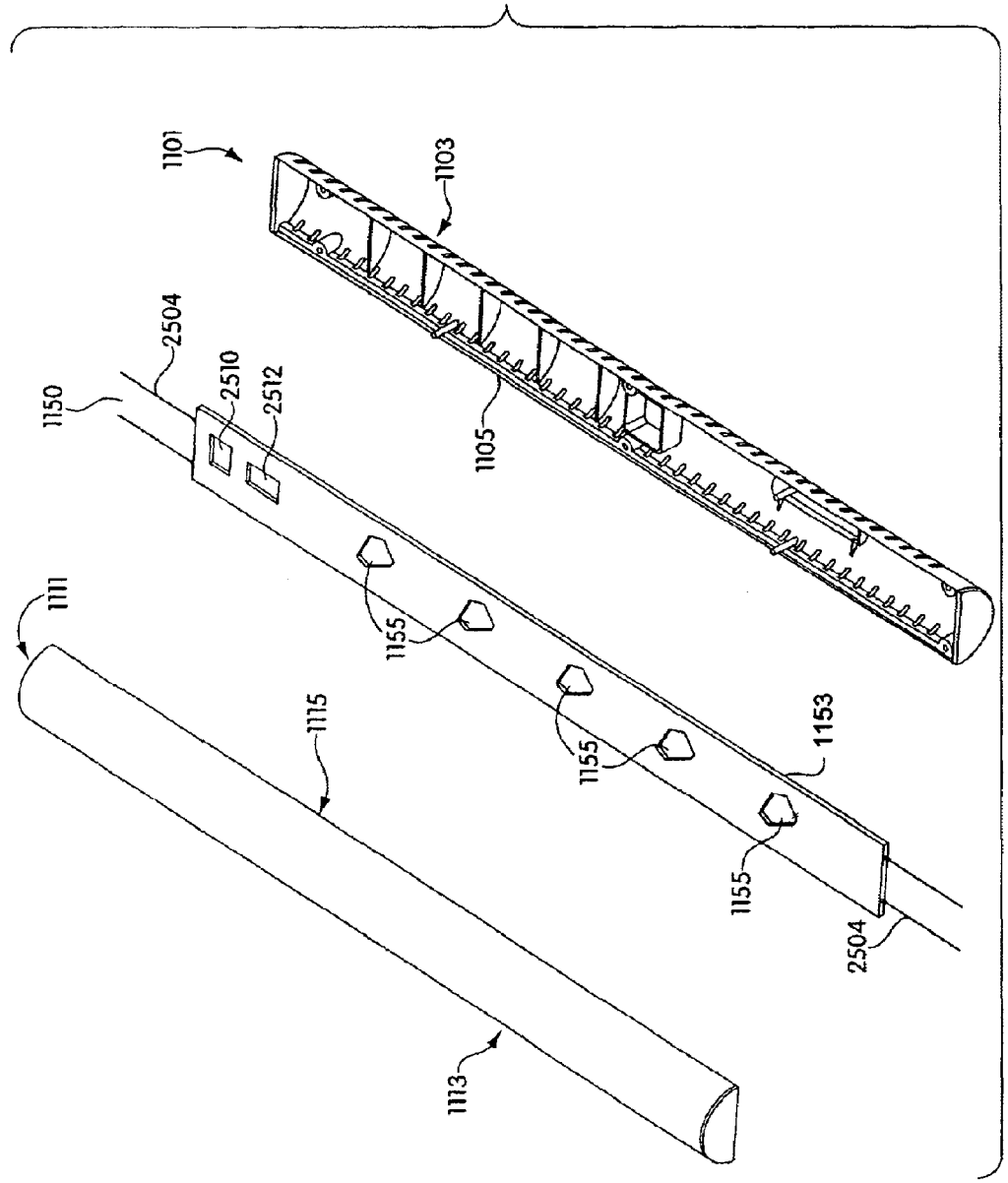
FIG. 29 depicts one possible LED lighting fixture which could be used to replace a fluorescent tube.

FIG. 29 shows one embodiment of a lighting fixture according to this disclosure which could be used as a replacement fluorescent tube in a housing such as the one in FIG. 28. The lighting fixture may comprise, in one embodiment, a variation on the lighting fixture (5000) in FIGS. 5a and 5b. The lighting fixture can comprise a bottom portion (1101) with a generally rounded underside (1103) and a generally flat connection surface (1105). The lighting fixture also comprises a top portion (1111) with a generally rounded upper portion (1113) and a generally flat connection surface (1115). The top portion (1111) will generally be comprised of a translucent, transparent, or similar material allowing light transmission an may comprise a filter similar to filter (391). The flat connection surfaces (1105) and (1115) can be placed together to form a generally cylindrical lighting fixture and can be attached by any method known in the art. Between top portion (1111) and bottom portion (1101) is a lighting fixture (1150) which comprises a generally rectangular mounting (1153) and a strip of at least one component illumination source such as an LED (1155). This construction is by no means necessary and the lighting fixture need not have a housing with it or could have a housing of any type known in the art. Although a single strip is shown, one of skill in the art would understand that multiple strips, or other patterns of arrangement of the illumination sources, could be used. The strips generally have the component LEDs in a sequence that separates the colors of LEDs if there are multiple colors of LEDs but such an arrangement is not required, The lighting fixture will generally have lamp connectors (2504) for connecting the lighting fixture to the existing lamp couplers (2408) (e.g., as shown in FIG. 28). The LED system may also include a control circuit (2510). This circuit may convert the ballast voltage into D.C. for the LED operation. The control circuit (2510) may control the LEDs (1155) with constant D.C. voltage or control circuit (2510) may generate control signals to operate the LEDs. In a preferred embodiment, the control circuit (2510) would include a processor for generating pulse width modulated control signals, or other similar control signals, for the LEDs.

These white lights therefore are examples of how a high-quality white light fixture can be generated with component illumination sources, even where those sources have dominant wavelengths outside the region of 530 m to 570 nm.

The above white light can contain programming which enables a user to easily control the light and select any desired color temperature that is available in the light. In one embodiment, the ability to select color temperature can be encompassed in a computer program using, for example, the following mathematical equations:

$$\text{Intensity of Amber } LED(T) = (5.6*10^{-8})T^3 - (6.4*10^{-4})T^2 + (2.3)T - 2503.7, \quad [1]$$

$$\text{Intensity of Warm Nichia } LED(T) = (9.5*10^{-3})T^3 - (1.2*10^{-3})T^2 + (4.4)T - 5215.2, \quad [2]$$

$$\text{Intensity of Cool Nichia } LED(T) = (4.7*10^{-8})T^3 - (6.3*10^{-4})T^2 + (2.8)T - 3909.6. \quad [3]$$

Where T=Temperature in degrees K.

These equations may be applied directly or may be used to create a look-up table so that binary values corresponding to a particular color temperature can be determined quickly. This table can reside in any form of programmable memory for use in controlling color temperature (such as, but not limited to, the control described in U.S. Pat. No. 6,016,038). In another embodiment, the light could have a selection of switches, such as DIP switches enabling it to operate in a stand-alone mode, where a desired color temperature can be selected using the switches, and changed by alteration of the stand alone product. The light could also be remotely programmed to operate in a standalone mode as discussed above.

The lighting fixture in FIG. 29 may also comprise a program control switch (2512). This switch may be a selector switch for selecting the color temperature, color of the LED system, or any other illumination conditions. For example, the switch may have multiple settings for different colors. Position "one" may cause the LED system to produce 3200K white light, position "two" may cause 4000K white light, position "three" may be for blue light and a fourth position may be to allow to allow the system to receive external signals for color or other illumination control. This external control could be provided by any of the controllers discussed previously.

Some fluorescent ballasts also provide for dimming where a dimmer switch on the wall will change the ballast output characteristics and as a result change the fluorescent light illumination characteristics. The LED lighting system may use this as information to change the illumination characteristics. The control circuit (2510) can monitor the ballast characteristics and adjust the LED control signals in a corresponding fashion. The LED system may have lighting control signals stored in memory within the LED lighting system. These control signals may be preprogrammed to provide dimming, color changing, a combination of effects or any other illumination effects as the ballasts' characteristics change.

A user may desire different colors in a room at different times. The LED system can be programmed to produce white light when the dimmer is at the maximum level, blue light when it is at 90% of maximum, red light when it is at 80%, flashing effects at 70% or continually changing effects as the dimmer is changed. The system could change color or other lighting conditions with respect to the dimmer or any other input. A user may also want to recreate the lighting conditions of incandescent light. One of the characteristics of such lighting is that it changes color temperature as its power is reduced. The incandescent light may be 2800K at full power but the color temperature will reduce as the power is reduced and it may be 1500K when the lamp dimmed to a great extent. Fluorescent lamps do not reduce in color temperature when they are dimmed. Typically, the fluorescent lamp's color does not change when the power is reduced. The LED system can be programmed to reduce in color temperature as the lighting conditions are dimmed. This may be achieved using a look-up table for selected intensities, through a mathematical description of the relationship between intensity and color temperature, any other method known in the art, or any combination of methods. The LED system can be programmed to provide virtually any lighting conditions.

The LED system may include a receiver for receiving signals, a transducer, a sensor or other device for receiving information. The receiver could be any receiver such as, but not limited to, a wire, cable, network, electromagnetic receiver, IR receiver, RF receiver, microwave receiver or any other receiver. A remote control device could be provided to change the lighting conditions remotely. Lighting instructions may also be received from a network. For example, a building may have a network where information is transmitted through a wireless system and the network could control the illumination conditions throughout a building. This could be accomplished from a remote site as well as on site. This may provide for added building security or energy savings or convenience.

The LED lighting system may also include optics to provide for evenly distributed lighting conditions from the fluorescent lighting fixture. The optics may be attached to the LED system or associated with the system.

The system has applications in environments where variations in available lighting may affect aesthetic choices.

In an example embodiment, the lighting fixture may be used in a retail embodiment to sell paint or other color sensitive items. A paint sample may be viewed in a retail store under the same lighting conditions present where the paint will ultimately be used. For example, the lighting fixture may be adjusted for outdoor lighting, or may be more finely tuned for sunny conditions, cloudy conditions, or the like. The lighting fixture may also be adjusted for different forms of interior lighting, such as halogen, fluorescent, or incandescent lighting. In a further embodiment, a portable sensor (as discussed above) may be taken to a site where the paint is to be applied, and the light spectrum may be analyzed and recorded. The same light spectrum may subsequently be reproduced by the lighting fixture, so that paint may be viewed under the same lighting conditions present at the site where the paint is to be used. The lighting fixture may similarly be used for clothing decisions, where the appearance of a particular type and color of fabric may be strongly influenced by lighting conditions. For example, a wedding dress (and bride) may be viewed under lighting conditions expected at a wedding ceremony, in order to avoid any unpleasant surprises. The lighting fixture can also be used in any of the applications, or in conjunction with any of the systems or methods discussed elsewhere in this disclosure.

In another example embodiment, the lighting fixture may be used to accurately reproduce visual effects. In certain visual arts, such as photography, cinematography, or theater, make-up is typically applied in a dressing room or salon, where lighting may be different than on a stage or other site. The lighting fixture may thus be used to reproduce the lighting expected where photographs will be taken, or a performance given, so that suitable make-up may be chosen for predictable results. As with the retail applications above, a sensor may be used to measure actual lighting conditions so that the lighting conditions may be reproduced during application of make-up.

In theatrical or film presentations, colored light often corresponds to the colors of specific filters which can be placed on white lighting instruments to generate a specific resulting shade. There are generally a large selection of such filters in specific shades sold by selected companies. These filters are often classified by a spectrum of the resulting light, by proprietary numerical classifications, and/or by names which give an implication of the resulting light such as "primary blue," "straw," or "chocolate." These filters allow for selection of a particular, reproducible color of light, but, at the same time, limit the director to those colors of filters that are available. In addition, mixing the colors is not an exact science which can result in slight variations in the colors as lighting fixtures are moved, or even change temperature, during a performance or film shoot. Thus, in one embodiment there is provided a system for controlling illumination in a theatrical environment. In another embodiment, there is provided a system for controlling illumination in cinematography.

The wide variety of light sources available create significant problems for film production in particular. Differences in lighting between adjacent scenes can disrupt the continuity of a film and create jarring effects for the viewer. Correcting the lighting to overcome these differences can be exacting, because the lighting available in an environment is not always under the complete control of the film crew. Sunlight, for example, varies in color temperature during the day, most obviously at dawn and dusk, when yellows and red abound, lowering the color temperature of the ambient light. Fluorescent light does not generally fall on the color temperature curve, often having extra intensity in blue-green regions of the spectrum, and is thus described by a correlated color temperature, representing the point on the color temperature curve that best approximates the incident light. Each of these lighting problems may be addressed using the systems described above.

The availability of a number of different fluorescent bulb types, each providing a different color temperature through the use of a particular phosphor, makes color temperature prediction and adjustment even more complicated. High-pressure sodium vapor lamps, used primarily for street lighting, produce a brilliant yellowish-orange light that will drastically skew color balance. Operating at even higher internal pressures are mercury vapor lamps, sometimes used for large interior areas such as gymnasiums. These can result in a pronounced greenish-blue cast in video and film. Thus, there is provided a system for simulating mercury vapor lamps, and a system for supplementing light sources, such as mercury vapor lamps, to produce a desired resulting color. These embodiments may have particular use in cinematography.

To try and recreate all of these lighting types, it is often necessary for a filmmaker or theatre designer to place these specific types of lights in their design. At the same time, the need to use these lights may thwart the director's theatric intention. The gym lights flashing quickly on and off in a supernatural thriller is a startling effect, but it cannot be achieved naturally through mercury vapor lamps which take up to five minutes to warm up and produce the appropriate color light.

Other visually sensitive fields depend on light of a specific color temperature or spectrum. For example, surgical and dental workers after require colored light that emphasizes contrasts between different tissues, as well as between healthy and diseased tissue. Doctors also often rely on tracers or markers that reflect, radiate, or fluoresce color of a specific wavelength or spectrum to enable them to detect blood vessels or other small structures. They can view these structures by shining light of the specific wavelength in the general area where the tracers are, and view the resultant reflection or fluorescing of the tracers. In many instances, different procedures may benefit from using a customized color temperature or particular color of light tailored to the needs of each specific procedure. Thus, there is provided a system for the visualization of medical, dental or other imaging conditions. In one embodiment, the system uses LEDs to produce a controlled range of light within a predetermined spectrum.

What is claimed is:

1. A lighting fixture for generating white light, comprising:
   a plurality of component illumination sources, said plurality including component illumination sources producing electromagnetic radiation of at least two different spectrums, each of said spectrums having a maximum spectral peak outside the region 510 nm to 570 nm; and
   a mounting holding said plurality, said mounting designed to allow said spectrums of said plurality to mix and form a resulting spectrum;
   wherein said resulting spectrum is continuous within the photopic response of the human eye; and
   wherein at least one of the plurality of component illumination sources has a maximum spectral peak less than 400 nm.

2. A lighting fixture for generating white light, comprising:
   a plurality of component illumination sources, said plurality including component illumination sources producing electromagnetic radiation of at least two different spectrums, each of said spectrums having a maximum spectral peak outside the region 510 nm to 570 nm; and
   a mounting holding said plurality, said mounting designed to allow said spectrums of said plurality to mix and form a resulting spectrum;
   wherein said resulting spectrum is continuous within the photopic response of the human eye; and
   wherein at least one of the plurality of component illumination sources has a maximum spectral peak greater than 700 nm.

3. A lighting fixture comprising:
   a plurality of LEDs, each of said plurality adapted to produce one of three preselected spectrums, each of said spectrums having a maximum spectral peak outside the region bounded by 530 nm and 570 nm;
   wherein the lighting fixture is configured such that additive interference of said spectrums results in white light that can be controlled to produce white light within a range of color temperatures;
   a controller enabling a particular color temperature within said range of color temperatures to be selected, and a signal to be generated representing that color temperature; and
   a processor in communication with said plurality of LEDs, said processor capable of receiving said signal from said controller and controlling the intensity of each of said plurality of LEDs in response thereto.

4. The lighting fixture of claim 3 wherein at least one of said preselcted spectrums has a maximum spectral peak of about 450 nm.

5. The lighting fixture of claim 3 wherein at least one of said preselected spectrums has a maximum spectral peak of about 592 nm.

6. The lighting fixture of claim 3, wherein said range of color temperatures extends from about 500K to about 10,000K.

7. The lighting fixture of claim 3, wherein said range of color temperatures extend from about 2300K to about 4500K.

8. A lighting fixture for replacing fluorescent tubes comprising:
   a mounting;
   at least two component illumination sources mounted on said mounting;
   a connector mounted on said mounting, said connector capable of connecting with a device adapted for holding fluorescent tubes to receive power from said device and provide power to said at least two component illumination sources; and
   a control circuit for controlling said at least two component illumination sources, wherein said control circuit comprises a processor.

9. The lighting fixture of claim 8 wherein said component illumination sources comprise LEDs.

10. The lighting fixture of claim 8, wherein the at least two component illumination sources include at least two white LEDs configured to generate respectively different spectrums.

11. The lighting fixture of claim 8 further comprising a housing for said mounting.

12. The lighting fixture of claim 11 wherein said housing is generally cylindrical in shape.

13. The lighting fixture of claim 11 wherein said housing includes a filter.

14. The lighting fixture of claim 11, wherein said housing includes at least one of a transparent portion and a translucent portion.

15. The lighting fixture of claim 8, wherein said control circuit is configured to control said at least two component illumination sources based on the power provided by said device adapted for holding fluorescent tubes.

16. The lighting fixture of claim 8
wherein said control circuit and said at least two component illumination sources are configured such that a mixing of radiation from the at least two component illumination sources is capable of producing white light.

17. The lighting fixture of claim 8
wherein each illumination source of the at least two component illumination sources is configured to generate radiation having an essentially white color.

18. The lighting fixture of claim 17, wherein the at least two component illumination sources include at least one white LED.

19. The lighting fixture of claim 8
wherein the at least two component illumination sources comprise:
a first illumination source configured to generate first radiation having a first spectrum; and
a second illumination source configured to generate second radiation having a second spectrum,
wherein the lighting fixture is configured such that a mixing of the first and second radiation, when power is provided to at least the first and second illumination sources, produces a resulting spectrum.

20. The lighting fixture of claim 19, wherein the first and second illumination sources are configured such that the first spectrum and the second spectrum are different.

21. The lighting fixture of claim 19, wherein the lighting fixture is configured such that a color of the resulting spectrum as perceived by an observer at a given time is an essentially non-white color.

22. The lighting fixture of claim 19, wherein the lighting fixture is configured such that a color of the resulting spectrum as perceived by an observer at a given time is an essentially white color.

23. The lighting fixture of any of claims 22–36, wherein the at least two component illumination sources include at least one LED.

24. The lighting fixture of claim 23, wherein the at least one LED includes at least one white LED.

25. The lighting fixture of claim 23, wherein the at least one LED includes at least one amber LED.

26. The lighting fixture of claim 23, wherein the at least one LED includes at least one red LED, at least one green LED, and at least one blue LED.

27. The lighting fixture of claim 23, wherein the at least one LED includes at least two white LEDs configured to generate respectively different spectrums.

28. The lighting fixture of claim 23, wherein the at least one LED includes an infrared (IR) LED.

29. The lighting fixture of claim 23, wherein the at least one LED includes an ultraviolet (UV) LED.

30. The lighting fixture of claim 23, wherein the at least two component illumination sources further comprise at least one third illumination source that is not an LED, the at least one third illumination source configured to generate third radiation having a third spectrum, the lighting fixture arranged such that, when power is provided to the first, second and third illumination sources, the third spectrum mixes with at least one of the first and second spectrums to produce the resulting spectrum.

31. The lighting fixture of claim 30, wherein the third spectrum has a maximum spectral peak wavelength within a range from approximately 510 nm to 570 nm.

32. The lighting fixture of claim 19, wherein the lighting fixture is configured such that the resulting spectrum is continuous within a photopic response of a human eye.

33. The lighting fixture of claim 19, wherein the lighting fixture is configured such that a portion of the resulting spectrum in a visible range has a lowest spectral valley having an intensity greater than background noise.

34. The lighting fixture of claim 19, wherein the lighting fixture is configured such that each spectral valley wavelength of the resulting spectrum within a photopic response of a human eye is less than a maximum spectral peak wavelength of the resulting spectrum.

35. The lighting fixture of claim 19, wherein the lighting fixture is configured such that within a visible range, the resulting spectrum is continuous, has no spectral valley wavelength greater than a maximum spectral peak wavelength of the resulting spectrum, and has a lowest spectral valley intensity greater than background noise.

36. The lighting fixture of claim 19, wherein each of the first and second spectrums has a maximum spectral peak wavelength outside a range from approximately 510 nm to 570 nm.

37. The lighting fixture of claim 19, wherein the control circuit is configured to independently control at least a first intensity of the first radiation and a second intensity of the second radiation.

38. The lighting fixture of claim 37, wherein the control circuit is configured to implement a pulse width modulation technique to control at least the first intensity of the first radiation and the second intensity of the second radiation.

39. The lighting fixture of claim 38, wherein the control circuit is configured as an addressable control circuit.

40. The lighting fixture of claim 39, wherein the lighting fixture is configured to be coupled to at least one other addressable lighting fixture so as to form a networked lighting system.

41. The lighting fixture of claim 37, wherein the controller is configured to independently control at least the first intensity of the first radiation and the second intensity of the second radiation so as to controllably vary an overall intensity of the resulting spectrum as perceived by an observer.

42. The lighting fixture of claim 37, wherein the controller is configured to independently control at least the first intensity of the first radiation and the second intensity of the second radiation so as to controllably vary an overall color of the resulting spectrum as perceived by an observer.

43. The lighting fixture of claim 42, wherein the overall color of the resulting spectrum as perceived by the observer is essentially white, and wherein the controller is configured to independently control at least the first intensity of the first radiation and the second intensity of the second radiation so as to controllably vary a color temperature of the resulting spectrum.

44. The lighting fixture of claim 37, wherein the control circuit is configured to independently control at least the first intensity of the first radiation and the second intensity of the second radiation in response to user input.

45. The lighting fixture of claim 44, wherein the lighting fixture is configured to be coupled to at least one user interface that provides at least one control signal to the control circuit.

46. The lighting fixture of claim 45, in combination with the at least one user interface.

47. The combination of claim 46, further in combination with the device adapted for holding fluorescent tubes.

48. The combination of claim 47, wherein the at least one user interface is affixed to the device adapted for holding fluorescent tubes.

49. The lighting fixture of claim 45, wherein the control circuit is configured to independently control at least the first intensity of the first radiation and the second intensity of the second radiation so as to controllably vary the resulting spectrum to generate essentially white light over a range of color temperatures.

50. The lighting fixture of claim 49, wherein the control circuit is configured to controllably vary the resulting spectrum in response to the at least one control signal and wherein the at least one control signal indicates a user specified color temperature in the range of color temperatures.

51. The lighting fixture of claim 49, in combination with the at least one user interface.

52. The combination of claim 51, wherein the at least one user interface includes:
at least one representation of the range of color temperatures; and
means for selecting a desired color temperature from the range of color temperatures.

53. The combination of claim 52, wherein the user interface includes at least one display configured to display the at least one representation of the range of color temperatures.

54. The combination of claim 52, wherein the means for selecting a desired color temperature includes at least one of a dial, a switch, a slider, and a touch-sensitive surface.

55. The combination of claim 51, wherein the at least one user interface is affixed to the lighting fixture.

56. The combination of claim 51, wherein the at least one user interface is capable of being affixed proximate the lighting fixture.

57. The combination of claim 51, wherein the at least one user interface is adapted to be mounted to a wall.

58. The lighting fixture of claim 49, in combination with a computer system comprising the at least one user interface.

59. The combination of claim 58, wherein the computer system includes means for controllably varying the resulting spectrum.

60. The combination of claim 58, wherein the computer system includes means for selecting a color temperature from the range of color temperatures.

61. The combination of claim 60, wherein the means for selecting a color temperature includes at least one of a keyboard, a mouse, a console, and a touch sensitive surface.

62. The combination of claim 58, wherein the computer system includes at least one display configured to display at least one representation of the range of color temperatures.

63. The combination of claim 62, wherein the at least one representation includes at least one of a color palette, a color range, chromaticity diagram and a Commission Internationale de l'Eclairage (CIE) diagram.

64. The combination of claim 62, wherein the display further indicates a current selected color temperature.

65. The lighting fixture of claim 45, wherein the control circuit includes a wireless receiver configured to receive remote wireless user input.

66. The lighting fixture of claim 65, in combination with the at least one user interface, wherein the at least one user interface includes a remote control unit adapted to wirelessly provide the at least one control signal to the control circuit.

67. The lighting fixture of claim 19, wherein the at least two component illumination sources include at least one LED including a phosphor.

68. The lighting fixture of claim 67, wherein:
the first illumination source includes the at least one LED including the phosphor;
the at least one LED including the phosphor is configured to irradiate the phosphor with pump radiation; and
the phosphor converts at least a portion of the pump radiation so as to emit the first radiation having the first spectrum.

69. The lighting fixture of claim 68, wherein the second illumination source is configured such that the second spectrum includes essentially amber light.

70. The lighting fixture of claim 69, wherein the second illumination source comprises at least one amber LED.

71. The lighting fixture of claim 70, wherein the control circuit is configured to independently control at least a first intensity of the first radiation and a second intensity of the second radiation so as to controllably vary an overall color of the resulting spectrum as perceived by an observer.

72. The lighting fixture of claim 71, wherein the control circuit is configured to implement a pulse width modulation technique to control at least the first intensity of the first radiation and the second intensity of the second radiation.

73. The lighting fixture of claim 71, wherein the control circuit is configured to controllably vary the resulting spectrum to produce essentially white light over a range of color temperatures.

74. The lighting fixture of claim 73, wherein the range of color temperatures includes approximately 4800K and wherein the control circuit is configured to control a composition of the resulting spectrum such that white light produced at approximately 4800K has a Color Rendering Index (CRI) value of at least 80.

75. The lighting fixture of claim 73, wherein the range of color temperatures includes approximately 2300K and wherein the control circuit is configured to control a composition of the resulting spectrum such that white light produced at approximately 2300K has a Color Rendering Index (CRI) value of at least 50.

76. The lighting fixture of claim 73, wherein the range of color temperatures includes at least one color temperature in a range from 500K to 2500K.

77. The lighting fixture of claim 73, wherein the control circuit is configured to independently control at least the first intensity of the first radiation and the second intensity of the second radiation in response to user input.

78. The lighting fixture of claim 77, wherein the lighting fixture is configured to be coupled to at least one user interface that provides at least one control signal to the control circuit.

79. The lighting fixture of claim 78, in combination with the at least one user interface.

80. The combination of claim 79, wherein the at least one user interface includes:
at least one representation of the range of color temperatures; and means for selecting a desired color temperature from the range of color temperatures.

81. The combination of claim 80, wherein the at least one user interface includes a control unit having at least one of a dial, a slider, a switch, and a touch-sensitive surface.

82. The lighting fixture of claim 71, wherein the control circuit is configured as an addressable control circuit.

83. The lighting fixture of claim 82, wherein the lighting fixture is configured to be coupled to at least one other addressable lighting fixture so as to form a networked lighting system.

84. The lighting fixture of claim 68, wherein the lighting fixture further comprises at least one filter to modify a portion of the resulting spectrum.

85. The lighting fixture of claim 84, wherein the at least one filter includes a high pass filter configured to attenuate a portion of at least one of the first spectrum and the second spectrum.

86. The lighting fixture of claim 84, wherein the at least one filter includes a high pass filter configured to attenuate a portion of the pump radiation not converted by the phosphor.

87. The lighting fixture of claim 68, wherein the first spectrum includes essentially green and red light.

88. The lighting fixture of claim 87, wherein the pump radiation includes essentially blue light.

89. The lighting fixture of claim 19, wherein the first illumination source includes at least one white LED.

90. The lighting fixture of claim 89, wherein the second illumination source includes at least one non-white LED.

91. The lighting fixture of claim 90, wherein the at least one non-white LED includes at least one of at least one red LED, at least one green LED, and at least one blue LED.

92. The lighting fixture of claim 90, wherein the at least one non-white LED includes at least one amber LED.

93. The lighting fixture of claim 92, wherein the at least one non-white LED further includes at least one of at least one red LED, at least one green LED, and at least one blue LED.

94. The lighting fixture of claim 19, wherein the first illumination source includes at least one white LED configured to generate the first radiation and wherein the second illumination source includes at least one second white LED configured to generate the second radiation.

95. The lighting fixture of claim 94, wherein the control circuit is configured to independently control at least a first intensity of the first radiation and a second intensity of the second radiation so as to controllably vary an overall color of the resulting spectrum as perceived by an observer.

96. The lighting fixture of claim 95, wherein the control circuit is configured to independently control at least the first intensity of the first radiation and the second intensity of the second radiation so as to controllably vary the resulting spectrum to generate essentially white light over a range of color temperatures.

97. The lighting fixture of claim 96, wherein the control circuit is configured to implement a pulse width modulation technique to control at least the first intensity of the first radiation and the second intensity of the second radiation.

98. The lighting fixture of claim 97, wherein the control circuit is configured as an addressable control circuit.

99. The lighting fixture of claim 98, wherein the lighting fixture is configured to be coupled to at least one other addressable lighting fixture so as to form a networked lighting system.

100. The lighting fixture of claim 97, wherein the control circuit is configured to independently control at least the first intensity of the first radiation and the second intensity of the second radiation in response to user input.

101. The lighting fixture of claim 100, wherein the lighting fixture is configured to be coupled to at least one user interface that provides at least one control signal to the control circuit.

102. The lighting fixture of claim 101, further including the at least one user interface.

103. The lighting fixture of claim 102, wherein the at least one user interface includes:
at least one representation of the range of color temperatures; and
means for selecting a desired color temperature from the range of color temperatures.

104. The lighting fixture of claim 103, wherein the at least one user interface includes a control unit having at least one of a dial, a slider, a switch, and a touch-sensitive surface.

105. The lighting fixture of claim 102, in combination with said device adapted for holding fluorescent tubes.

106. The lighting fixture of claim 19, wherein:
the at least two component illumination sources include a plurality of LEDs;
the mounting includes at least one linear track; and
the plurality of LEDs are mounted in an essentially linear arrangement along the at least one linear track.

107. The lighting fixture of claim 106, wherein the plurality of LEDs include at least one first white LED configured to generate the first radiation and at least one second white LED configured to generate the second radiation.

108. The lighting fixture of claim 107, wherein the control circuit is configured to independently control at least a first intensity of the first radiation and a second intensity of the second radiation.

109. The lighting fixture of claim 108, wherein the control circuit is configured as an addressable control circuit.

110. The lighting fixture of claim 109, wherein the lighting fixture is configured to be coupled to at least one other addressable lighting fixture so as to form a networked lighting system.

111. The lighting fixture of claim 108, wherein the control circuit is configured to implement a pulse width modulation technique to control at least the first intensity of the first radiation and the second intensity of the second radiation.

112. The lighting fixture of claim 111, wherein the control circuit is configured to independently control at least the first intensity of the first radiation and the second intensity of the second radiation in response to user input.

113. The lighting fixture of claim 112, wherein the lighting fixture is configured to be coupled to at least one user interface that provides at least one control signal to the control circuit.

114. The lighting fixture of claim 113, in combination with the at least one user interface.

115. The combination of claim 114, wherein the at least one user interface includes:
at least one representation of the range of color temperatures; and
means for selecting a desired color temperature from the range of color temperatures.

116. The combination of claim 115, wherein the at least one user interface is capable of being affixed proximate to the lighting fixture.

117. The combination of claim 115, wherein the at least one user interface is configured to be affixed to the lighting fixture.

118. The lighting fixture of claim 106, further comprising an essentially cylindrical housing substantially enclosing the mounting.

119. The lighting fixture of claim 118, wherein the essentially cylindrical housing includes a portion that is at least one of transparent and translucent.

120. The lighting fixture of claim 118, wherein the essentially cylindrical housing includes at least one filter.

121. The lighting fixture of claim 106, in combination with the device adapted for holding fluorescent tubes.

122. The lighting fixture of claim 19, further comprising at least one sensor operatively coupled to the processor, the at least one sensor providing information to the processor to control a composition of the resulting spectrum.

123. The lighting fixture of claim 122, wherein the overall color of the resulting spectrum as perceived by the observer is essentially white, and wherein the processor is configured to independently control at least one of the first intensity of the first radiation and the second intensity of the second radiation so as to controllably vary a color temperature of the resulting spectrum.

124. The lighting fixture of claim 123, wherein the information from the at least one sensor includes ambient light information relating to ambient light proximate the lighting fixture.

125. The lighting fixture of claim 124, wherein the processor is configured to calibrate the lighting fixture based on the ambient light information.

126. The lighting fixture of claim 123, wherein the information from the at least one sensor includes remote illumination information relating to illumination conditions remote from the lighting fixture.

127. The lighting fixture of claim 126, wherein the processor is configured to adjust the resulting spectrum according to the information from the at least one sensor to essentially reproduce the remote illumination conditions.

128. The lighting fixture of claim 124, wherein the information from the at least one sensor further includes remote light information about illumination conditions remote from the lighting fixture and wherein the processor is configured to adjust the resulting spectrum to substantially match the ambient light information with the remote light information.

129. The lighting fixture of claim 123, wherein the lighting fixture further comprises a user interface coupled to the processor and adapted to provide user control over the composition of the resulting spectrum.

130. The lighting fixture of claim 129, wherein the user interface includes:
at least one representation of the range of colors; and
means for selecting a color from the range of colors.

131. The lighting fixture of claim 130, wherein the at least one representation includes at least one of a color palette, a color range, chromaticity diagram and a Commission Internationale de l'Eclairage (CIE) diagram.

132. A lighting fixture for generating white-light, comprising:
a plurality of component illumination sources including at least two white LEDs configured to generate electromagnetic radiation of at least two different spectrums; and
a mounting holding said plurality, said mounting designed to allow said spectrums of said plurality to mix and form a resulting spectrum;
wherein the visible portion of said resulting spectrum has intensity greater than background noise at its lowest spectral valley.

133. The lighting fixture of claim 132 wherein said resulting spectrum has intensity at its lowest spectral valley which is at least 5% of its intensity at its maximum spectral peak.

134. The lighting fixture of claim 132 wherein said resulting spectrum has intensity at its lowest spectral valley which is at least 10% of its intensity at its maximum spectral peak.

135. The lighting fixture of claim 132 wherein said resulting spectrum has intensity at its lowest spectral valley which is at least 25% of its intensity at its maximum spectral peak.

136. The lighting fixture of claim 132 wherein said resulting spectrum has intensity at its lowest spectral valley which is at least 50% of its intensity at its maximum spectral peak.

137. The lighting fixture of claim 132 wherein said white light can be generated at a color temperature within a preselected range of color temperatures.

138. The lighting fixture of claim 137, further comprising:
a controller configured to control the plurality of component illumination sources to selectably generate the white light from the lighting fixture at a particular color temperature within said range of color temperatures.

139. The lighting fixture of claim 138, wherein the controller is configured to control the plurality of component illumination sources such that white light produced at 4800K has a Color Rendering Index (CRI) value of at least 80.

140. The lighting fixture of claim 139, wherein the controller is configured to control the plurality of component illumination sources such that white light produced at 2300K has a Color Rendering Index (CRI) value of at least 50.

141. The lighting fixture of claim 132, wherein the plurality of component illumination sources include at least two component illumination sources comprising:
a first illumination source including at least one first white LED configured to generate first radiation having a first spectrum; and
a second illumination source including at least one second white LED configured to generate second radiation having a second spectrum,
wherein the lighting fixture is configured such that a mixing of the first and second radiation, when power is provided to at least the first and second illumination sources, produces the resulting spectrum.

142. The lighting fixture of claim 141, wherein the lighting fixture is configured such that a color of the resulting spectrum as perceived by an observer at a given time is an essentially white color.

143. The lighting fixture of claim 141, wherein the lighting fixture is configured such that within a visible range, the resulting spectrum is continuous and has no spectral valley wavelength greater than a maximum spectral peak wavelength of the resulting spectrum.

144. The lighting fixture of claim 141, wherein each of the first and second spectrums has a maximum spectral peak wavelength outside a range from approximately 510 nm to 570 nm.

145. The lighting fixture of any of claims 141–144, wherein the at least two component illumination sources further include at least one non-white LED.

146. The lighting fixture of claim 145, wherein the at least one non-white LED includes at least one amber LED.

147. The lighting fixture of claim 145, wherein the at least one non-white LED includes at least one red LED, at least one green LED, and at least one blue LED.

148. The lighting fixture of claim 145, wherein the at least one non-white LED includes at least one amber LED, and at least one of at least one red LED, at least one green LED, and at least one blue LED.

149. The lighting fixture of claim 145, wherein the at least one non-white LED includes an infrared (IR) LED.

150. The lighting fixture of claim 145, wherein the at least one non-white LED includes an ultraviolet (UV) LED.

151. The lighting fixture of claim 145, wherein the at least two component illumination sources further comprise at least one third illumination source that is not an LED, the at least one third illumination source configured to generate third radiation having a third spectrum, the lighting fixture arranged such that, when power is provided to the first, second and third illumination sources, the third spectrum mixes with at least one of the first and second spectrums to produce the resulting spectrum.

152. The lighting fixture of claim 151, wherein the third spectrum has a maximum spectral peak wavelength within a range from approximately 510 nm to 570 nm.

153. The lighting fixture of claim 141, further comprising a control circuit configured to independently control at least a first intensity of the first radiation and a second intensity of the second radiation.

154. The lighting fixture of claim 153, wherein the control circuit is configured to implement a pulse width modulation technique to control at least the first intensity of the first radiation and the second intensity of the second radiation.

155. The lighting fixture of claim 154, wherein the control circuit is configured as an addressable control circuit.

156. The lighting fixture of claim 155, wherein the lighting fixture is configured to be coupled to at least one other addressable lighting fixture so as to form a networked lighting system.

157. The lighting fixture of claim 153, wherein the control circuit is configured to independently control at least the first intensity of the first radiation and the second intensity of the second radiation in response to user input.

158. The lighting fixture of claim 157, wherein the control circuit includes a wireless receiver configured to receive remote wireless user input.

159. The lighting fixture of claim 158, in combination with at least one user interface, wherein the at least one user interface includes a remote control unit adapted to wirelessly provide at least one control signal to the control circuit.

160. The lighting fixture of claim 157, wherein the lighting fixture is configured to be coupled to at least one user interface that provides at least one control signal to the control circuit.

161. The lighting fixture of claim 160, wherein the control circuit is configured to independently control at least the first intensity of the first radiation and the second intensity of the second radiation so as to controllably vary the resulting spectrum to generate essentially white light over a range of color temperatures.

162. The lighting fixture of claim 161, wherein the control circuit is configured to controllably vary the resulting spectrum in response to the at least one control signal and wherein the at least one control signal indicates a user specified color temperature in the range of color temperatures.

163. The lighting fixture of claim 162, in combination with the at least one user interface.

164. The combination of claim 163, wherein the at least one user interface includes:
at least one representation of the range of color temperatures; and
means for selecting a desired color temperature from the range of color temperatures.

165. The combination of claim 164, wherein the user interface includes at least one display configured to display the at least one representation of the range of color temperatures.

166. The combination of claim 164, wherein the means for selecting a desired color temperature includes at least one of a dial, a switch, a slider, and a touch-sensitive surface.

167. The lighting fixture of claim 161, in combination with a computer system comprising the at least one user interface.

168. The combination of claim 167, wherein the computer system includes means for controllably varying the resulting spectrum.

169. The combination of claim 167, wherein the computer system includes means for selecting a color temperature from the range of color temperatures.

170. The combination of claim 169, wherein the means for selecting a color temperature includes at least one of a keyboard, a mouse, a console, and a touch sensitive surface.

171. The combination of claim 167, wherein the computer system includes at least one display configured to display at least one representation of the range of color temperatures.

172. The combination of claim 171, wherein the at least one representation includes at least one of a color palette, a color range, chromaticity diagram and a Commission Internationale de l'Eclairage (CIE) diagram.

173. The combination of claim 171, wherein the display further indicates a current selected color temperature.

174. The lighting fixture of claim 141, wherein:
the at least two component illumination sources include a plurality of LEDs;
the mounting includes at least one linear track; and
the plurality of LEDs are mounted in an essentially linear arrangement along the at least one linear track.

175. The lighting fixture of claim 174, wherein the plurality of LEDs include the at least two white LED and at least one amber LED.

176. The lighting fixture of claim 174, wherein the plurality of LEDs include at least one of at least one amber LED, at least one red LED, at least one green LED and at least one blue LED.

177. The lighting fixture of claim 174, further comprising an essentially cylindrical housing substantially enclosing the mounting.

178. The lighting fixture of claim 177, wherein the essentially cylindrical housing includes a portion that is at least one of transparent and translucent.

179. The lighting fixture of claim 177, wherein the essentially cylindrical housing includes at least one filter.

180. The lighting fixture of claim 179, wherein the at least one filter includes at least one of a diffuse filter, a colored filter, and a high pass filter.

181. A lighting fixture for generating white light, comprising:
a plurality of component illumination sources including at least one white LED, said plurality including component illumination sources producing electromagnetic radiation of at least two different spectrums; and
a mounting holding said plurality, said mounting designed to allow said spectrums of said plurality to mix and form a resulting spectrum;

wherein each spectral valley wavelength of the resulting spectrum within a photopic response of a human eye is less than a maximum spectral peak wavelength of the resulting spectrum.

182. The lighting fixture of claim 181 wherein said component illumination sources include LEDs.

183. The lighting fixture of claim 181, wherein said resulting spectrum does not have a spectral valley wavelength longer than a maximum spectral peak wavelength in a range from 400 nm to 700 nm.

184. The lighting fixture of claim 181, wherein said white light can be generated at a color temperature within a preselected range of color temperatures.

185. A lighting fixture of claim 184, wherein said range of color temperatures includes at least one color temperature from the range 500K to 2500K.

186. A method for generating light comprising:
A) mounting a plurality of component illumination sources, including at least two white LEDs producing electromagnetic radiation of at least two different spectrums, in such a way as to mix the spectrums; and
B) choosing said at least two different spectrums in such a way that the mix of the spectrums forms a resulting spectrum having an intensity greater than background noise at its lowest spectral valley within the photopic response of the human eye.

187. The method of claim 186, wherein the act A) includes an act of mounting at least two component illumination sources comprising:
a first illumination source including at least one first white LED configured to generate first radiation having a first spectrum; and
a second illumination source including at least one second white LED configured to generate second radiation having a second spectrum, such that a mixing of the first and second radiation, when power is provided to at least the first and second illumination sources, produces the resulting spectrum.

188. The method of claim 187, wherein the act B) includes an act of selecting the first and second illumination sources such that within a visible range, the resulting spectrum is continuous and has no spectral valley wavelength greater than a maximum spectral peak wavelength of the resulting spectrum.

189. The method of claim 187, wherein the act B) includes an act of selecting the first and second illumination sources such that each of the first and second spectrums has a maximum spectral peak wavelength outside a range from approximately 510 nm to 570 nm.

190. The method of claim 187, wherein the act B) includes an act of selecting the first and second illumination sources to include at least one of at least one amber LED, at least one red LED, at least one green LED, and at least one blue LED.

191. The method of claim 190, wherein the act A) includes an act of mounting at least one third illumination source that is not an LED, the at least one third illumination source configured to generate third radiation having a third spectrum, such that when power is provided to the first, second and third illumination sources, the third spectrum mixes with at least one of the first and second spectrums to produce the resulting spectrum.

192. The method of claim 191, wherein the third spectrum has a maximum spectral peak wavelength within a range from approximately 510 nm to 570 nm.

193. The method of claim 187, further including an act of:
C) independently controlling at least a first intensity of the first radiation and a second intensity of the second radiation.

194. The method of claim 193, wherein the act C) includes an act of implementing a pulse width modulation technique to control at least the first intensity of the first radiation and the second intensity of the second radiation.

195. The method of claim 194, wherein the act C) includes an act of receiving addressed data to control at least the first intensity of the first radiation and the second intensity of the second radiation.

196. The method of claim 195, further comprising an act of forming a networked lighting system using at least the first and second illumination sources.

197. The method of claim 193, wherein the act C) includes an act of independently controlling at least the first intensity of the first radiation and the second intensity of the second radiation so as to controllably vary an overall color of the resulting spectrum as perceived by an observer.

198. The method of claim 193, wherein act C) includes an act of independently controlling at least the first intensity of the first radiation and the second intensity of the second radiation in response to user input.

199. The method of claim 198, wherein the act C) includes an act of receiving remote wireless user input to control the first and second illumination sources.

200. The method of claim 199, further comprising an act of wirelessly providing at least one control signal to control the first and second illumination sources.

201. The method of claim 198, further comprising an act of:
D) receiving at least one control signal from at least one user interface to perform the act C).

202. The method of claim 201, further including an act of affixing the at least one user interface to the plurality of component illumination sources.

203. The method of claim 201, further including an act of affixing the at least one user interface proximate the plurality of component illumination sources.

204. The method of claim 201, further including an act of mounting the at least one user interface to a wall.

205. The method of claim 201, wherein the act C) includes an act of independently controlling at least the first intensity of the first radiation and the second intensity of the second radiation so as to controllably vary the resulting spectrum to generate essentially white light over a range of color temperatures.

206. The method of claim 205, wherein the range of color temperatures includes approximately 4800K and wherein the act C) includes an act of controlling a composition of the resulting spectrum such that white light produced at approximately 4800K has a Color Rendering Index (CRI) value of at least 80.

207. The method of claim 205, wherein the range of color temperatures includes approximately 2300K and wherein the act C) includes an act of controlling a composition of the resulting spectrum such that white light produced at approximately 2300K has a Color Rendering Index (CRI) value of at least 50.

208. The method of claim 205, wherein the range of color temperatures includes at least one color temperature in a range from 500K to 2500K.

209. The method of claim 205, wherein the act C) includes an act of controllably varying the resulting spectrum in response to the at least one control signal, wherein the at least one control signal indicates a user specified color temperature in the range of color temperatures.

210. The method of claim 205, wherein the at least one user interface includes:
   at least one representation of the range of color temperatures; and
   means for selecting a desired color temperature from the range of color temperatures.

211. The method of claim 210, wherein the means for selecting a desired color temperature includes at least one of a dial, a switch, a slider, and a touch-sensitive surface.

212. The method of claim 210, wherein the user interface includes at least one display configured to display the at least one representation of the range of color temperatures.

213. The method of claim 187, wherein the at least two component illumination sources further include at least one third LED including a phosphor.

214. The method of claim 213, wherein:
   the first illumination source includes the at least one third LED including the phosphor;
   the at least one third LED including the phosphor is configured to irradiate the phosphor with pump radiation; and
   the phosphor converts at least a portion of the pump radiation so as to emit at least a portion of the first radiation having the first spectrum.

215. The method of claim 214, wherein the second illumination source is configured such that the second spectrum includes essentially amber light.

216. The method of claim 214, wherein the portion of the first spectrum emitted by the at least one third LED includes essentially green and red light.

217. The method of claim 216, wherein the pump radiation includes essentially blue light.

218. The method of claim 187, further comprising an act of filtering a portion of the resulting spectrum.

219. The method of claim 218, wherein the act of filtering includes an act of attenuating a portion of at least one of the first spectrum and the second spectrum.

220. The method of claim 218, wherein the act of filtering includes an act of using at least of a high pass filter and a yellow filter.

221. The method of claim 187, wherein:
   the at least two component illumination sources include a plurality of LEDs; and
   the act A) includes an act of mounting the plurality of LEDs in an essentially linear arrangement along at least one linear track.

222. The method of claim 221, wherein the act B) includes an act of selecting the plurality of LEDs to include the at least two white LEDs and at least one amber LED.

223. The method of claim 221, further comprising an act of substantially enclosing the at least one linear track in an essentially cylindrical housing.

224. The method of claim 223, wherein the essentially cylindrical housing includes a portion that is at least one of transparent and translucent.

225. The method of claim 223, wherein the essentially cylindrical housing includes at least one filter.

226. The method of claim 187, further comprising an act of controlling a composition of the resulting spectrum based on information provided by at least one sensor.

227. The method of claim 226, wherein the overall color of the resulting spectrum as perceived by an observer is essentially white, and wherein the act of controlling includes an act of independently controlling at least one of the first intensity of the first radiation and the second intensity of the second radiation so as to controllably vary a color temperature of the resulting spectrum.

228. The method of claim 227, wherein the information from the at least one sensor includes remote illumination information relating to illumination conditions remote from the plurality of component illumination sources.

229. The method of claim 228, wherein the act of controlling includes an act of adjusting the resulting spectrum according to the information from the at least one sensor to essentially reproduce the remote illumination conditions.

230. The method of claim 227, wherein the information from the at least one sensor includes ambient light information relating to ambient light proximate the plurality of component illumination sources.

231. The method of claim 230, wherein the act of controlling includes an act of calibrating the plurality of component illumination sources based on the ambient light information.

232. The method of claim 230, wherein the information from the at least one sensor further includes remote light information about illumination conditions remote from the plurality of component illumination sources and wherein the act of controlling includes an act of adjusting the resulting spectrum to substantially match the ambient light information with the remote light information.

233. The method of claim 227, further comprising an act of providing user control over the composition of the resulting spectrum.

234. An apparatus, comprising:
   a device adapted for holding fluorescent tubes; and
   a lighting fixture for replacing fluorescent tubes, the lighting fixture being coupled to the device adapted for holding fluorescent tubes and comprising:
      a mounting;
      at least two component illumination sources mounted on said mounting;
      a connector mounted on said mounting, said connector capable of connecting with the device adapted for holding fluorescent tubes to receive power from said device and provide power to said at least two component illumination sources; and
      a control circuit for controlling said at least two component illumination sources, wherein said control circuit comprises a processor.

235. The apparatus of claim 234, wherein said device comprises a transformer to transform power from a power source.

236. The apparatus of claim 235, wherein the transformer is a ballast and the transformed power provided to the fixture is related to an impedance of the ballast.

237. The apparatus of claim 236, wherein the at least two component illumination sources include a plurality of LEDs.

238. The apparatus of claim 237, wherein the control circuit is configured to receive the power provided to the fixture and vary an intensity of radiation produced by at least one of the plurality of LEDs based on the received power.

239. The apparatus of claim 236, wherein the at least two component illumination sources include at least one white LED.

240. The apparatus of claim 239, wherein the at least two component illumination sources includes at least one amber LED.

241. The apparatus of claim 240, further comprising a converter circuit electrically connected to the plurality of LEDs to convert a ballast voltage to a DC voltage.

242. The lighting fixture of claim 132 wherein said resulting spectrum has intensity at its lowest spectral valley which is at least 75% of its intensity at its maximum spectral peak.

243. The lighting fixture of claim 132 wherein said component illumination sources include only LEDs.

* * * * *